(12) United States Patent
Chu et al.

(10) Patent No.: US 10,560,158 B2
(45) Date of Patent: *Feb. 11, 2020

(54) TRIGGERED UPLINK TRANSMISSIONS IN WIRELESS LOCAL AREA NETWORKS

(71) Applicant: Marvell World Trade Ltd., St. Michael (BB)

(72) Inventors: Liwen Chu, San Ramon, CA (US);
Yakun Sun, San Jose, CA (US);
Hongyuan Zhang, Fremont, CA (US);
Lei Wang, San Diego, CA (US);
Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/025,273

(22) Filed: Jul. 2, 2018

(65) Prior Publication Data

US 2018/0309483 A1  Oct. 25, 2018

Related U.S. Application Data

(63) Continuation of application No. 15/380,795, filed on Dec. 15, 2016, now Pat. No. 10,014,917.

(Continued)

(51) Int. Cl.
*H04B 7/0452* (2017.01)
*H04W 28/02* (2009.01)
(Continued)

(52) U.S. Cl.
CPC ......... *H04B 7/0452* (2013.01); *H04L 5/0007* (2013.01); *H04L 5/0037* (2013.01);
(Continued)

(58) Field of Classification Search
CPC ............... H04W 72/12; H04W 72/121; H04W 72/1289; H04W 76/10; H04W 76/15;
(Continued)

(56) References Cited

U.S. PATENT DOCUMENTS 7,599,332 B2  10/2009  Zelst et al.
7,742,390 B2  6/2010  Mujtaba
(Continued)

OTHER PUBLICATIONS

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).
(Continued)

*Primary Examiner* — Ashley Shivers

(57) ABSTRACT

In a method for communicating in a wireless communication network a trigger frame is generated to trigger simultaneous uplink transmissions by multiple communication devices. The trigger frame includes a padding portion having a length determined based on respective time duration requirements of the multiple communication devices, the respective time duration requirements for preparing uplink transmission by the corresponding second communication devices. The trigger frame is transmitted to the multiple communication devices. The simultaneous uplink transmissions, triggered by the trigger frame, are received from the multiple communication devices.

22 Claims, 14 Drawing Sheets

Related U.S. Application Data

(60) Provisional application No. 62/358,236, filed on Jul. 5, 2016, provisional application No. 62/267,513, filed on Dec. 15, 2015.

(51) Int. Cl.
    *H04W 72/12*     (2009.01)
    *H04L 5/00*     (2006.01)
    *H04W 72/04*     (2009.01)
    *H04W 84/12*     (2009.01)

(52) U.S. Cl.
    CPC ....... *H04L 5/0053* (2013.01); *H04W 28/0231* (2013.01); *H04W 72/0413* (2013.01); *H04W 72/0446* (2013.01); *H04W 72/121* (2013.01); *H04W 72/1289* (2013.01); *H04L 5/0091* (2013.01); *H04W 84/12* (2013.01)

(58) Field of Classification Search
CPC ..... H04W 28/18; H04W 28/16; H04W 28/02; H04W 28/0215; H04W 28/0231; H04W 28/0289; H04L 1/0048; H04B 7/0413; H04B 7/0452; H04B 7/0495
See application file for complete search history.

(56) References Cited

U.S. PATENT DOCUMENTS

| | | | |
|---|---|---|---|
| 8,155,138 B2 | 4/2012 | van Nee | |
| 8,270,909 B2 | 9/2012 | Zhang et al. | |
| 8,289,869 B2 | 10/2012 | Sawai | |
| 8,526,351 B2 | 9/2013 | Fischer et al. | |
| 8,619,907 B2 | 12/2013 | Mujtaba et al. | |
| 8,724,720 B2 | 5/2014 | Srinivasa et al. | |
| 9,166,660 B2 | 10/2015 | Chu et al. | |
| 9,197,298 B2 | 11/2015 | Kim et al. | |
| 9,351,297 B2 | 5/2016 | Aboul-Magd et al. | |
| 10,014,917 B2 | 7/2018 | Chu et al. | |
| 2009/0196163 A1 | 8/2009 | Du | |
| 2011/0002219 A1 | 1/2011 | Kim et al. | |
| 2011/0243262 A1 | 10/2011 | Ratasuk et al. | |
| 2011/0261708 A1 | 10/2011 | Grandhi | |
| 2012/0039196 A1 | 2/2012 | Zhang | |
| 2013/0223427 A1 | 8/2013 | Sohn et al. | |
| 2013/0229996 A1 | 9/2013 | Wang et al. | |
| 2014/0044069 A1 | 2/2014 | Bao et al. | |
| 2014/0254351 A1 | 9/2014 | Newman et al. | |
| 2014/0307612 A1 | 10/2014 | Vermani et al. | |
| 2015/0124689 A1 | 5/2015 | Merlin et al. | |
| 2015/0131517 A1 | 5/2015 | Chu et al. | |
| 2015/0319747 A1 | 11/2015 | Chu et al. | |
| 2015/0319782 A1 | 11/2015 | Chu et al. | |
| 2016/0014804 A1 | 1/2016 | Merlin et al. | |
| 2016/0150505 A1 | 5/2016 | Hedayat | |
| 2016/0165574 A1 | 6/2016 | Chu et al. | |
| 2016/0165589 A1 | 6/2016 | Chu et al. | |
| 2016/0255606 A1 | 9/2016 | Chu et al. | |
| 2016/0295581 A1 | 10/2016 | Ghosh et al. | |
| 2017/0171851 A1 | 6/2017 | Lan | |

OTHER PUBLICATIONS

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE P802.11n™ D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

IEEE Std 802.11-REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11™ 2012 (Revision of IEEE Std 802.11—2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.16™—2012 (Revision of IEEE Std. 802.16—2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Ansari et al., "Unified MIMO Pre-Coding Based on Givens Rotation," The Institute of Electrical and Electronics Engineers, doc. No. IEEE C802.16e-04/516r2, pp. 1-13, (Jan. 11, 2005).

Chen, "Home Network Basis: Transmission Environments and Wired/Wireless Protocols," Prentice Hall, pp. 1-26 (Jul. 2006).

Chun et al., "Legacy Support on HEW frame structure," doc: IEEE 11-13/1057r0, *The Institute of Electrical and Electronics Engineers, Inc.*, pp. 1-8 (Sep. 2013).

Hiertz et al., "The IEEE 802.11 Universe," IEEE Communications Magazine, pp. 62-70, (Jan. 2010).

Love et al., "An Overview of Limited Feedback in Wireless Communication Systems," IEEE J. on Selected Areas in Communications, vol. 26, No. 8, pp. 1341-1365 (Oct. 2008).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Seok et al., "HEW PPDU Format for Supporting MIMO-OFDMA," IEEE 802.11-14/1210r0, 16 pages, (Sep. 14, 2014).

(56) References Cited

OTHER PUBLICATIONS

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
van Nee et al. "The 802.11n MIMO-OFDM Standard for Wireless LAN and Beyond," Wireless Personal Communications, vol. 37, pp. 445-453 (Jun. 2006).
Zhang et al., "Beamforming Feedback for Single Stream," *The Institute of Electrical and Electronics Engineers*, doc. No. IEEE 802.11-12/1312r0, pp. 1-22 (Nov. 12, 2012).
International Search Report and Written Opinion in International Patent Application No. PCT/US2016/066956, dated Mar. 13, 2017 (14 pages).
Merlin et al., "Duration and MAC Padding for MU PPDUs," IEEE Draft, doc. IEEE 802.11-15/0876r1, vol. 802.11ax, No. 1, pp. 1-16 (Jul. 13, 2015).
Ryu et al., "UL MU Procedure," IEEE Draft, doc. IEEE 802.11-15/0365r0, vol. 802.11ax, pp. 1-16 (Mar. 9, 2015).
Zhang et al., "HE PHY Padding and Packet Extension," IEEE Draft, doc. IEEE 802.11-15/0810, vol. 802.11ax, No. 1, pp. 1-46 (Sep. 12, 2015).
International Preliminary Report on Patentability in International Patent Application No. PCT/US2016/066956, dated Jun. 28, 2018 (9 pages).

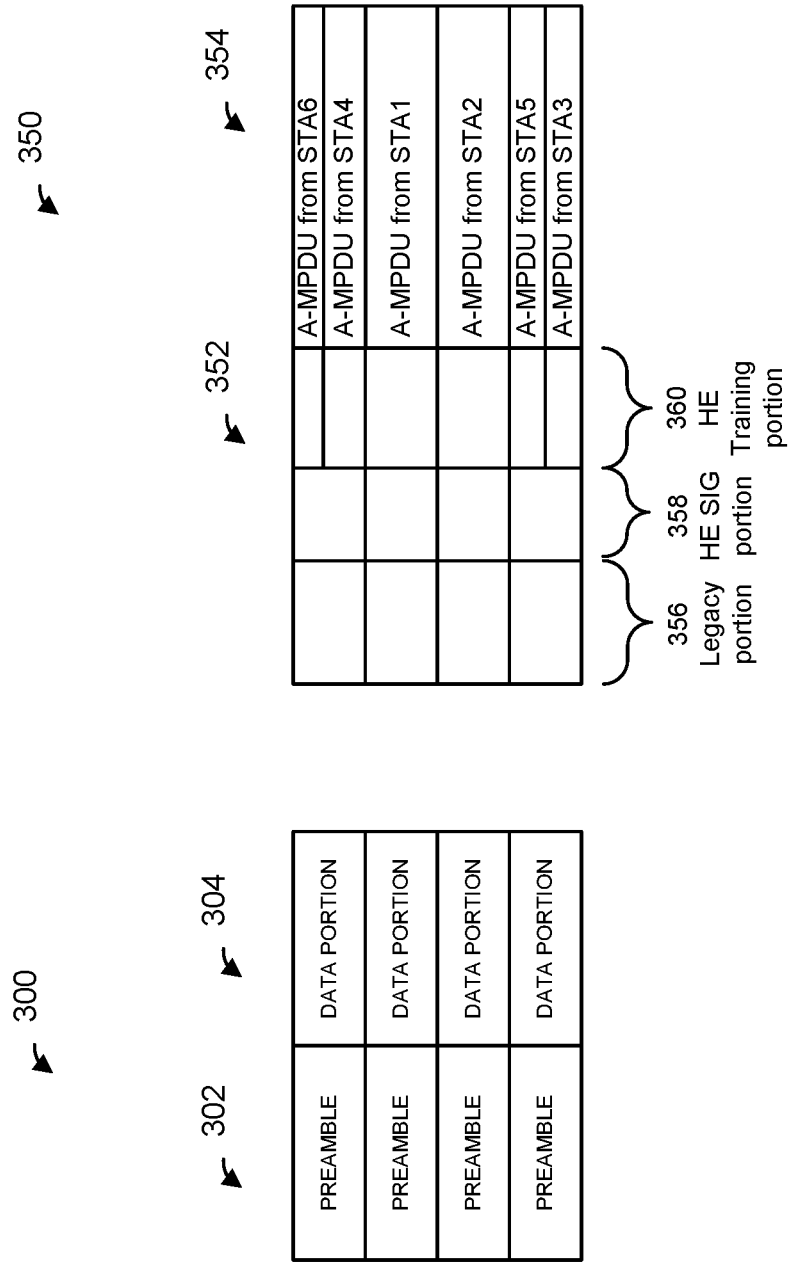

| Type value B3 B2 | Type description | Subtype value B7 B6 B5 B4 | Subtype description |
|---|---|---|---|
| 01 | Control | 0000-0011 | Reserved |
| 01 | Control | 0100 | Beamforming Report Poll |
| 01 | Control | 0101 | VHT NDP Announcement |
| 01 | Control | 0110 | Control Frame Extension |
| 01 | Control | 0111 | Control Wrapper |
| 01 | Control | 1000 | Block Ack Request (BlockAckReq) |
| 01 | Control | 1001 | Block Ack (BlockAck) |
| 01 | Control | 1010 | PS-Poll |
| 01 | Control | 1011 | RTS |
| 01 | Control | 1100 | CTS |
| 01 | Control | 1101 | Ack |
| 01 | Control | 1110 | CF-End |
| 01 | Control | 1111 | CF-End +CF-Ack |

| B0 | B2 | B3 | B4 | B5 | B6 | B7 | B15 |

TRIGGERED UPLINK TRANSMISSIONS IN WIRELESS LOCAL AREA NETWORKS

CROSS-REFERENCES TO RELATED APPLICATIONS

This application is a continuation of U.S. patent application Ser. No. 15/380,795, now U.S. patent Ser. No. 10/014,917, entitled "Triggered Uplink Transmissions in Wireless Local Area Networks," filed on Dec. 15, 2016, which claims the benefit of U.S. Provisional Patent Application No. 62/267,513, entitled "PHY Indication of MAC Trigger," filed on Dec. 15, 2015, and U.S. Provisional Patent Application No. 62/358,236, entitled "1 lax Trigger Frame MAC Padding Extension," filed on Jul. 5, 2016. All of the applications referenced above are hereby expressly incorporated herein by reference in their entireties.

FIELD OF THE DISCLOSURE

The present disclosure relates generally to communication networks and, more particularly, to wireless local area networks that utilize orthogonal frequency division multiple access (OFDMA).

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for communicating in a wireless communication network includes generating, at a first communication device, a trigger frame to trigger simultaneous uplink transmissions by multiple second communication devices, wherein the trigger frame includes a padding portion, and wherein a length of the padding portion is determined based on respective time duration requirements of the multiple second communication devices, the respective time duration requirements for preparing uplink transmission by the corresponding second communication devices. The method also includes transmitting, with the first communication device, the trigger frame to the multiple second communication devices. The method additionally includes receiving, at the first communication device, the simultaneous uplink transmissions, triggered by the trigger frame, from the multiple second communication devices.

In another embodiment, a first communication device comprises a network interface device having one or more integrated circuits configured to generate a trigger frame to trigger simultaneous uplink transmissions by multiple second communication devices, wherein the trigger frame includes a padding portion, and wherein a length of the padding portion is determined based on respective time duration requirements of the multiple second communication devices, the respective time duration requirements for preparing uplink transmission by the corresponding second communication devices. The one or more integrated circuits are further configured to transmit the trigger frame to the multiple second communication devices. The one or more integrated circuits are additionally configured to receive the simultaneous uplink transmissions, triggered by the trigger frame, from the multiple second communication devices.

BRIEF DESCRIPTION OF THE DRAWINGS

FIGS. 3A-3C are block diagrams of example data units, according to some embodiments;

FIG. 7 is a table that illustrates various values of a subtype subfield of a control field and corresponding control frame subtypes, according to an embodiment;

FIG. 12 is a block diagram of a service field, according to an embodiment;

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred herein as "high efficiency WiFi," "HEW" communication protocol, "HE" communication protocol, or IEEE 802.11ax communication protocol. In an embodiment, the first communication protocol supports orthogonal frequency division (OFDM) communication in both downlink direction from the AP to one or more client station and uplink direction from one or more client stations to the AP. In an embodiment, the first communication protocol supports a single user (SU) mode, in which the AP transmits a data unit to one client station, or receives a data unit from one client station, at any given time. The first communication protocol also supports one or more multi-user (MU) modes in which the AP transmits multiple independent data streams simultaneously to multiple client stations, or receives independent data units simultaneously transmitted by multiple client stations, in some embodiments. Multi-user transmission to, or by, multiple client stations is performed using MU multiple input multiple output (MU-MIMO) transmission in which respective spatial streams are used for transmission to, or by, respective ones of the multiple client stations and/or using orthogonal frequency division multiple access (OFDMA) transmission in which respective frequency sub-channels of a communication channel are used for simultaneous transmission to, or by, respective ones of multiple client stations, in various embodiments.

Figure 1:
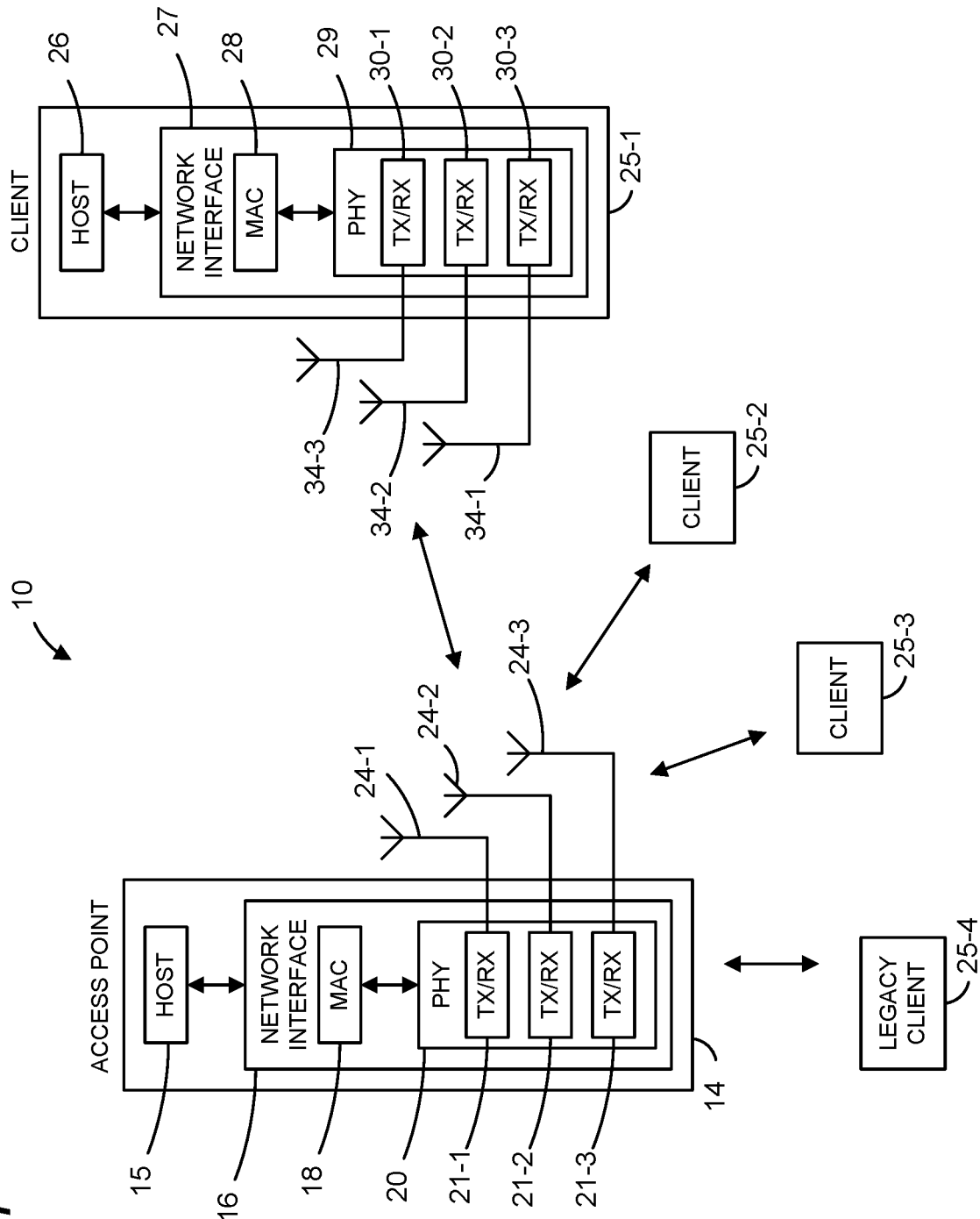
FIG. 1 is a block diagram of an example wireless local area network (WLAN), according to an embodiment.

FIG. 1 is a block diagram of an example wireless local area network (WLAN) 10 in which techniques described below are utilized, according to an embodiment. The WLAN 10 supports downlink (DL) and/or uplink (UL) OFDMA communication between an access point (AP) and a plurality of client stations, in some embodiments. The WLAN 10 also supports DL and/or uplink UL multiuser multiple-input and multiple-output (MU-MIMO) communication between the AP and a plurality of client stations, in some embodiments. Additionally, the WLAN 10 supports DL and UL single-user (SU) communication between the AP and each of a plurality of client stations, in some embodiments.

The WLAN 10 includes an AP 14, and the AP 14, in turn, includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In an embodiment, the MAC processing unit 18 and the PHY processing unit 20 are configured to operate according to the first communication protocol (e.g., HE communication protocol). In an embodiment, the network interface device 16 includes one or more integrated circuit (IC) devices. For example, at least some of the functionality of the MAC processing unit 18 and at least some of the functionality of the PHY processing unit 20 are implemented on a single IC device, according to an embodiment. As another example, at least some of the functionality of the MAC processing unit 18 is implemented on a first IC device, and at least some of the functionality of the PHY processing unit 20 is implemented on a second IC device, according to an embodiment.

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to a legacy communication protocol (referred to herein as a "legacy client station").

The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In an embodiment, the MAC processing unit 28 and the PHY processing unit 29 are configured to operate according to the first communication protocol (e.g., HE communication protocol). In an embodiment, the network interface device 27 includes one or more IC devices. For example, at least some of the functionality of the MAC processing unit 28 and at least some of the functionality of the PHY processing unit 29 are implemented on a single IC device, according to an embodiment. As another example, at least some of the functionality of the MAC processing unit 28 is implemented on a first IC device, and at least some of the functionality of the PHY processing unit 29 is implemented on a second IC device, according to an embodiment.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to a second, legacy communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol and having formats described herein and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

In an embodiment, when operating in single-user mode, the AP 14 transmits a data unit to a single client station 25 (DL SU transmission), or receives a data unit transmitted by a single client station 25 (UL SU transmission), without simultaneous transmission to, or by, any other client station 25. When operating in multi-user mode, the AP 14 transmits a data unit that includes multiple data streams for multiple client stations 25 (DL MU transmission), or receives data units simultaneously transmitted by multiple client stations 25 (UL MU transmission), in an embodiment. For example, in multi-user mode, a data unit transmitted by the AP includes multiple data streams simultaneously transmitted by the AP 14 to respective client stations 25 using respective spatial streams allocated for simultaneous transmission to the respective client stations 25 and/or using respective sets of OFDM tones corresponding to respective frequency sub-channels allocated for simultaneous transmission to the respective client stations.

Figures 2A, 2B:
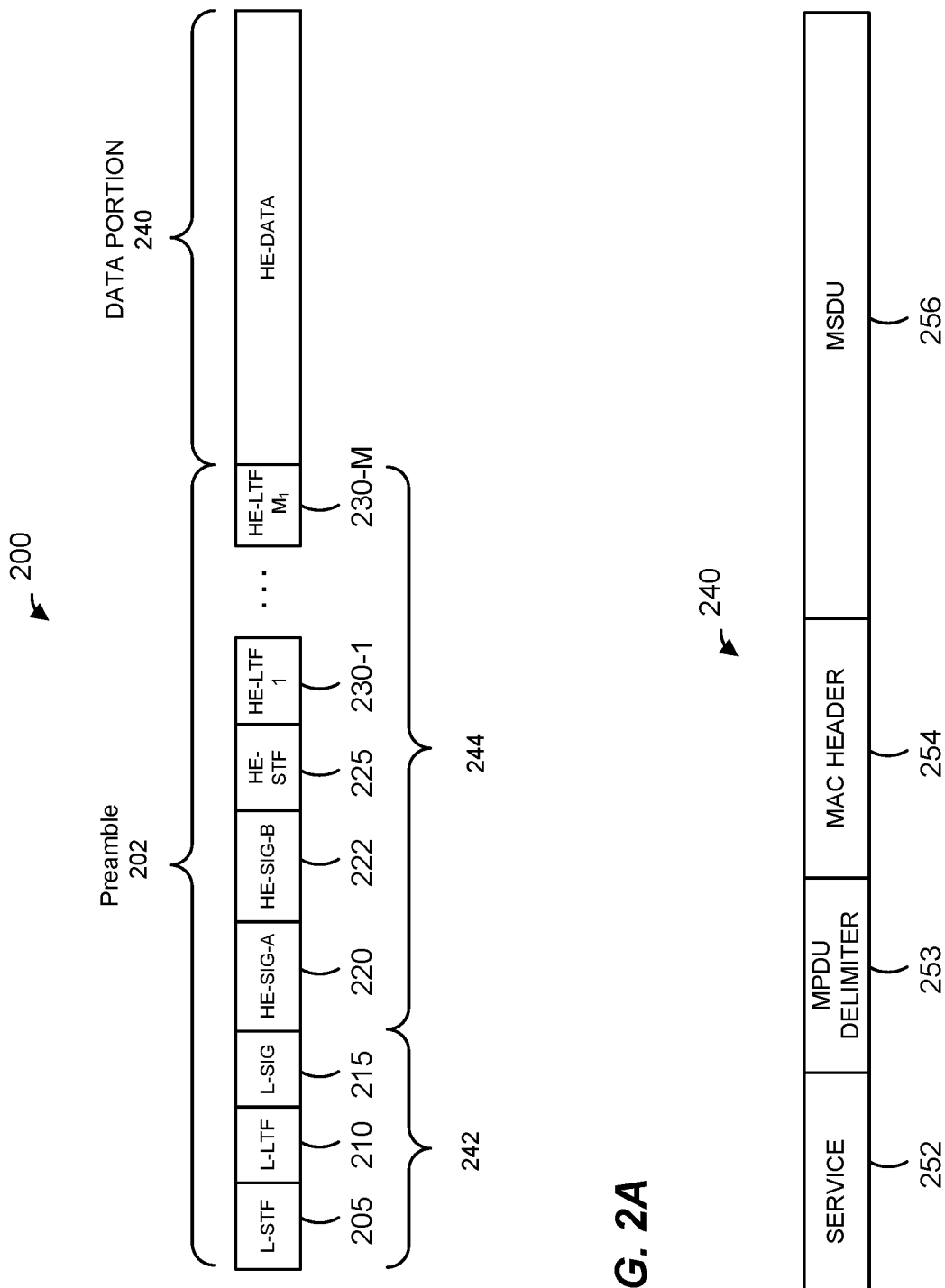
FIG. 2A is a diagram of a physical layer (PHY) data unit, according an embodiment.
FIG. 2B is a diagram of a data portion of a physical layer (PHY) data unit, according an embodiment.

FIG. 2A is a diagram of a physical layer (PHY) data unit 200 that the AP 14 is configured to transmit to one or more client stations 25 (e.g., the client stations 25-1), according to an embodiment. In an embodiment, one or more client stations 25 (e.g., the client stations 25-1) are also configured to transmit data units the same as or similar to the data unit 200 to the AP 14. The data unit 200 conforms to the HE communication protocol and occupies a 20 MHz bandwidth. Data units similar to the data unit 200 occupy other suitable bandwidth such as 40 MHz, 80 MHz, 160 MHz, 320 MHz, 640 MHz, for example, or other suitable bandwidths, in other embodiments. The data unit 200 is suitable for "mixed mode" situations, i.e. when the WLAN 10 includes a client station (e.g., the legacy client station 25-4) that conforms to a legacy communication protocol, but not the first communication protocol. The data unit 200 is utilized in other situations as well, in some embodiments.

In various embodiments and/or scenarios, the data unit 200 is a downlink (DL) orthogonal frequency division multiple access (OFDMA) unit in which independent data streams are transmitted to multiple client stations 25 using respective sets of OFDM tones and, in some cases respective spatial streams, allocated to the client stations 25. Similarly, in various embodiments and/or scenarios, the data unit 200 is an uplink (UL) OFDMA data unit transmitted by a particular client station 25 as part of an OFDMA uplink transmission by multiple client stations 25, wherein each of the multiple client stations 25 transmits data using a set of OFDM tones and, in some cases, respective one or more spatial streams, allocated to the client station 25. For example, in an embodiment, available OFDM tones (e.g., OFDM tones that are not used as DC tone and/or guard tones) are partitioned into multiple resource units (RUs), and each of the multiple RUs is allocated to one or more client stations 25 for transmission of data to, or by, the one or more of the client stations 25. In an embodiment, allocation of OFDM tones is performed using basic resource unit blocks defined by the first communication protocol. A basic resource unit block is sometimes referred to herein as simply a "basic resource unit." For example, a basic resource unit includes K OFDM tones, wherein K is an integer greater than zero, and each allocated resource unit is comprised of one or more K-OFDM tone basic resource units, in an embodiment. As just an example, K=26, in an embodiment. Accordingly, a basic resource unit includes 26 OFDM tones, in this embodiment. A resource unit allocated to a client station 25, or allocated to a multi-user group of client stations 25, includes a number of OFDM tones that is an integer multiple of 26 OFDM tones, such as 26 OFDM tones, 52 OFDM tones, 78 OFDM tones, etc., in this embodiment. In another embodiment, K is any suitable integer other than 26, and a basic resource unit includes a corresponding number of OFDM tones other than 26.

The data unit 200 includes a preamble 202 including a legacy short training field (L-STF) 205, a legacy long training field (L-LTF) 210, a legacy signal field (L-SIG) 215, a first HE signal field (HE-SIG-A) 220, a second HE signal field (HE-SIG-B) 222, an HE short training field (HE-STF) 225, and M HE long training fields (HE-LTFs) 230. L-STF 205, L-LTF 210 and L-SIG 215 comprise a legacy preamble portion 242 of the preamble 202. The HE-SIG-A 220, the HE-SIG-B 222, the HE-STF 225 and the M HE-LTFs 230 comprise an HE preamble portion 244 of the preamble 202. In some embodiments and/or scenarios, the data unit 200 also includes a data portion 240. Referring briefly to FIG. 2B, in an embodiment, the data portion 240 includes a service field 252, an MPDU delimiter 153, a MAC header 254 and a MAC service data unit (MSDU) 256. In an embodiment, the MPDU delimiter field 253 includes an indication of the length of the data unit 200 and/or the length of the MSDU 256 included in the data unit 200. In some embodiments, the data portion 240 includes multiple MPDU delimiter fields 253 and multiple MSDUs 256. For example, as compared to the embodiment illustrated in FIG. 2B, in some embodiment, the data portion 240 includes one or more additional MPDU delimiter fields 253, each of the one or more additional MPDU delimiter fields 253 followed by a respective additional MSDU 256, in an embodiment. In some embodiments, the data portion 240 additionally includes one or more padding portions (not illustrated), each of the one or more padding portions having one or more padding bits. For example, a respective padding portion is included with (e.g., appended to) each of the one or more MSDUs 256 in the data portion 240 to ensure that each MSDU 256 includes an integer number of octets of bits, as indicated by the length indicator in the MPDU delimiter that immediately precedes the MSDU 256, in an embodiment.

Referring back to FIG. 2A, the data unit 200 omits the data portion 240, in some embodiments. In some embodiments and/or scenarios, each of one or more of the fields 205-235 is repeated one or more times in the time domain. For example, the HE-SIGA field 220 is repeated one or more times in the time domain to increase transmission robustness and reliability of the HE-SIGA field 220, in an embodiment. With continued reference to FIG. 2A, in some embodiments and/or scenarios, the preamble 202 omits one or more of the fields 205-235. For example, the preamble 202 omits the HE-SIG-A 220 and/or the HE-SIG-B 222, in an embodiment. In some embodiments, the preamble 202 includes additional fields not illustrated in FIG. 2A.

Each of the L-STF 205, the L-LTF 210, the L-SIG 215, the HE-SIG-A 220, the HE-SIG-B 222, the HE-STF 225, and the M HE-LTFs 230 comprises one or more OFDM symbols. The HE-SIG-A 220 and the HE-SIG-B 222 is each individually encoded to generate the respective number of OFDM symbols, in an embodiment. As merely an example, in an embodiment, the HE-SIG-A 220 comprises two OFDM symbols, and the HE-SIG-B 222 comprises one OFDM symbol. As merely another example, in another embodiment, the HE-SIG-A 220 comprises one OFDM symbol, and the HE-SIG-B comprises two OFDM symbols. As yet another example, in an embodiment, the HE-SIG-A 220 comprises two OFDM symbols, and the HE-SIG-B 222 comprises a variable number of OFDM symbols. In an embodiment in which the HE-SIG-B 222 comprises a variable number of OFDM symbols, the particular number of HE-SIG-B 222 OFDM symbols in the data unit 200 is indicated in the HE-SIG-A 220.

In the embodiment of FIG. 2A, the data unit 200 includes one of each of the L-STF 205, the L-LTF 210, the L-SIG 215, the HE-SIG-A 220. In other embodiments in which a data unit similar to the data unit 200 occupies a cumulative bandwidth other than 20 MHz, each of the L-STF 205, the L-LTF 210, the L-SIG 215 and HE-SIG-A 220 is repeated over a corresponding number of 20 MHz sub-bands of the whole bandwidth of the data unit, in an embodiment. For example, in an embodiment, the data unit occupies an 80 MHz bandwidth and, accordingly, includes four of each of the L-STF 205, the L-LTF 210, the L-SIG 215, the HE-SIG-A 220. In an embodiment in which a data unit similar to the data unit 200 occupies a cumulative bandwidth other than 20 MHz, the HE-SIG-B is repeated over a corresponding number of 20 MHz sub-bands of the whole bandwidth of the data unit. In another embodiment in which a data unit similar to the data unit 200 occupies a cumulative bandwidth other than 20 MHz, the HE-SIG-B 222 includes different channel-specific portions corresponding to different 20 MHz sub-bands of the whole bandwidth of the data unit, and the different channel specific portions are transmitted in parallel in the corresponding 20 MHz sub-bands of the whole bandwidth of the data unit 200.

In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIG-B and the HE data portion occupy the corresponding whole bandwidth of the data unit.

In an embodiment, the HE-SIG-A 220 and the HE-SIG-B 222 generally carry information about the format of the data unit 200, such as information needed to properly decode at least a portion of the data unit 200, in an embodiment. In an embodiment in which the data unit 200 is a multi-user data unit, HE-SIG-A 220 carries information commonly needed by multiple intended receivers of the data unit 200. In some embodiments, HE-SIG-A 220 additionally includes information for receivers that are not intended receivers of the data unit 200, such as information needed for medium protection. On the other hand, HE-SIG-B 222 carries user-specific information individually needed by each intended receiver of the data unit 200, in an embodiment. In an embodiment, HE-SIG-A 220 includes information needed to properly decode HE-SIG-B 222, and HE-SIG-B 222 includes information needed to properly decode data streams in the data portion 240 of the data unit 200. In some embodiments and/or scenarios, however, HE-SIG-A field 220 includes information needed to decode the data portion 240, and HE-SIG-B 222 is omitted from the data unit 200 in at least some such embodiments. In at least some embodiments and scenarios in which an AP (e.g., the AP 14) is the intended recipient of the data unit 200 (i.e., when the data unit 200 is an uplink data unit), information needed to properly decode the data portion of the data unit 200 is known a priori to the intended recipient of the data unit 200 and need not be included in the preamble of the data unit 200. In some such embodiments, the HE-SIG-B 222 is omitted from the data unit 200.

In some embodiments, specific information included in the HE-SIG-A 220 and/or in the HE-SIG-B 222 depends on the mode of transmission of the data unit 200. For example, in an embodiment, different information is included in the HE-SIG-A 220 when the data unit 200 is a downlink data unit as compared to information included in the HE-SIG-A 220 when the data unit 200 is an uplink data unit. Additionally or alternatively, different information is included in the HE-SIG-A 220 when the data unit 200 is a multi-user data unit as compared to information included in the HE-SIG-A 220 when the data unit 200 is a single-user data unit, in an embodiment. In another embodiment, different information is included in the HE-SIG-B 222 when the data unit 200 is a downlink data unit as compared to the information is included in the HE-SIG-B 222 when the data unit 200 is an uplink data unit.

Figure 3C:
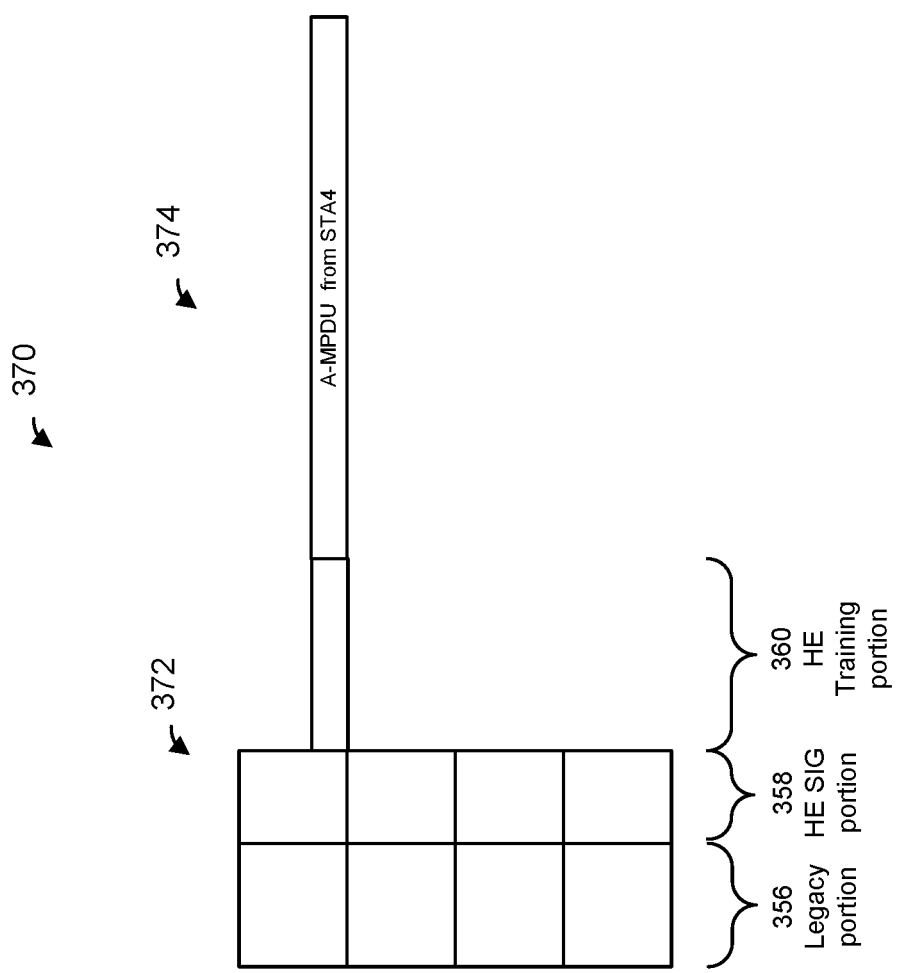

FIGS. 3A-3C are block diagrams of example PHY data units that occupy an 80 MHz bandwidth, according to embodiments. Referring first to FIG. 3A, a data unit 300 is generally similar to the data unit 200 of FIG. 2A, in an embodiment. The data unit 300 includes a preamble portion 302 and a data portion 304. In an embodiment, the preamble portion 302 corresponds to a legacy preamble and conforms to a preamble format according to a legacy communication protocol, such as the IEEE 802.11a Standard, the IEEE 802.11n Standard, or the IEEE 802.11ac Standard, for example, in an embodiment. In another embodiment, the preamble 302 corresponds to a non-legacy preamble that conforms to the IEEE 802.11ax Standard, for example. For example, in an embodiment, the preamble portion 302 includes a preamble such as the preamble 202 of FIG. 2A. At least some fields in the preamble portion 302 are duplicated in each 20 MHz bandwidth of the data unit 300. For example, the preamble portion 302 includes an L-STF field, an L-LTF field, an L-SIG field, an HE-SIG-A field, an HE-SIG-B field, an HE-STF field and HE-LTF fields such as the L-STF field 205, the L-LTF field 210, the L-SIG field 215, the HE-SIG-A field 220, the HE-SIG-B 222, the HE-STF 225, and HE-LTFs 230, respectively, and each of the L-STF field, the L-LTF field, the L-SIG field and the HE-SIG-A field, the HE-SIG-B field, the HE-STF field, and the HE-LTF fields is duplicated in each 20 MHz bands of the data unit 300, in an embodiment. In an embodiment, at least some fields in the preamble portion 302 are different in different 20 MHz bands of the data unit 300. For example, at least a portion of an HE-SIG-B field, such as the HE-SIG-B field 222, is different (e.g., includes information) in different 20 MHz bands of the data unit 300, in an embodiment.

The data portion 304 of the data unit 300 is duplicated in each 20 MHz band of the data unit 300, in an embodiment, e.g. when the preamble portion 302 is a legacy preamble and is and duplicated in each 20 MHz band. In an embodiment, the data portion 304 includes a trigger frame that triggers uplink OFDMA transmission by a plurality of client stations 25. In an embodiment, the trigger frame includes information that indicates allocation of subchannels to be used for uplink OFDMA transmission, in an embodiment. The trigger frame further indicates other transmission parameters to the multiple client stations 25, such as which modulation and coding scheme (MCS) each of the multiple client stations 25 should use, the OFDM numerology (e.g., guard interval, tone spacing, etc.) that each of the multiple client stations should use, transmit power that each of the multiple client stations 25 should use, etc. In an embodiment, the trigger frame is a duplicate broadcast frame transmitted to the multiple client stations 25 in each 20 MHz band of the data unit 300. In another embodiment, the trigger frame is a broadcast frame that occupies the entire 80 MHz bandwidth of the data unit 300.

Referring now to FIG. 3B, a data unit 350 is generally similar to the data unit 200 of FIG. 2A, in an embodiment. The data unit 350 includes a preamble portion 352 and a data portion 354. The preamble portion 352 includes a legacy portion 356, an HE signal field portion 358 and an HE training field portion 360. The legacy portion 356 includes an L-STF field, an L-LTF field and an L-SIG field such as the L-STF field 205, the L-LTF field 210, the L-SIG field 215, respectively, in an embodiment. The HE signal field portion 358 includes one or more HE signal fields such as the HE-SIG-A 220 and/or the HE-SIG-B 222, in an embodiment. The HE signal field portion 358 omits the HE-SIG-B 222, in some situations, in an embodiment. For example, the HE signal field portion 358 omits the HE-SIG-B 222 when the data unit 300 is an uplink data unit, in an embodiment. The HE training field portion 358 includes HE training fields such as the HE-STF 225 and the HE-LTFs 230, in an embodiment.

In an embodiment, the data portion 354 of the data unit 350 includes a plurality of aggregated MAC protocol data units (A-MPDU) respectively directed to ones of multiple client stations 25. In an embodiment, at least some of the A-MPDUs in the data portion 354 occupy subchannels that span a width of less than 20 MHz. For example, A-MPDU to (or from) STA1, A-MPDU to (or from) STA2, and A-MPDU to (or from) STA3 each occupies subchannels that span a width of less than 20 MHz, in an embodiment. In an embodiment, the legacy portion 356 and the HE SIG portion 358 of the preamble 352 spans multiple data units that collectively occupy a 20 MHz bandwidth. On the other hand, the HE training portion 360 of the preamble 352 includes respective training field portions that occupy respective ones of the multiple subchannels in the 20 MHz bandwidths, in an embodiment.

In another embodiment, at least some of the A-MPDUs in the data portion 354 occupy subchannels that span a width of more than 20 MHz. As just an example, an A-MPDU in the data portion 354 occupies a subchannel that spans 40 MHz, in an embodiment. For example A-MPDU to (or from) STA5 in FIG. 3B spans a 40 MHz bandwidth, in an embodiment. In an embodiment, the legacy portion 356 and the HE SIG portion 358 of the preamble 352 is duplicated in each 20 MHz band of the 40 MHz bandwidth. On the other hand, the HE training portion 360 of the preamble 352 spans the entire 40 MHz bandwidth, in an embodiment.

The data unit 350 is a downlink OFDMA data unit transmitted by the AP to a plurality of client stations 25, in an embodiment. In another embodiment, respective A-MPDUs in the data portion 354 are transmitted by multiple client stations 25 as parts of an OFDMA transmission by multiple client stations 25. In an embodiment, an uplink data unit transmitted by a client station 25 includes the legacy preamble portion 354 and the HE signal field portion 356. Additionally, the uplink data unit transmitted by the client station 25 includes a portion of the HE training field portion 260 corresponding to the subchannel allocated for the uplink transmission by the client station 25. Referring briefly to FIG. 3C, an uplink data unit 370 is transmitted by STA4, in an embodiment. The uplink data unit 370 includes a preamble 372. The data unit 370 further includes a data portion 374. The data portion 374 includes a data unit (e.g., an A-MPDU) in the subchannel allocated to STA3, in an embodiment. In an embodiment, the preamble 372 includes the legacy portion 356 and the HE signal portion 358, in an embodiment. The preamble 372 additionally includes a portion of the HE training portion 360 that corresponds to the subchannel allocated to STA4. In the embodiment of FIG. 3C, the legacy portion 356 and the HE signal portion 358 is each repeated in multiple 20 MHz subbands of the bandwidth of the uplink data unit 370. In another embodiment, the legacy portion 356 and the HE signal portion 358 each occupies only one or more 20 MHz subbands of the data unit 370 that include the data portion 274. Thus, for example, the legacy portion 356 and the HE signal portion 358 each only the first 20 MHz subband that includes the A-MPDU from STA4, in an embodiment. Similarly, in an embodiment, the HE training portion 360 occupies one or more 20 MHz subbands of the data unit 370 that include the data portion 274. Thus, for example, the HE training portion 360 occupies the entire first 20 MHz subband of the data unit 370 that includes the A-MPDU from STA4, in an embodiment.

Referring back to FIG. 3B, in an embodiment in which the data unit 350 is a downlink OFDMA transmission to multiple client stations 25, one or more A-MPDUs in the data portion 354 include respective trigger frames, aggregated with data, to trigger uplink transmission by the corresponding client stations 25. The trigger frames in the data portion 354 are unicast trigger frames directed to respective ones of the multiple client stations 25, in an embodiment. In an embodiment, a trigger frame, in the data portion 354, transmitted to a particular client station 25 includes information that indicates a subchannel to be used for uplink transmission by the particular client station 25, in an embodiment. In an embodiment, the trigger frame to the particular client station 25 further includes information that indicates other transmission parameters for the particular client station 25, such as which modulation and coding scheme (MCS) the client station should use for uplink transmission, the OFDM numerology (e.g., guard interval, tone spacing, etc.) that the client station should use for uplink transmission, transmit power the client station 25 should use for uplink transmission, etc. In an embodiment in which an A-MPDU in the data portion 354 includes a trigger frame, the trigger frame is included as the first data unit (e.g., prepended to one or more data unit that contain data for the client station) in the A-MPDU such that the client station 25 can at least begin preparing for the triggered uplink transmission before the entire A-MPDU is received by the client station 25.

Additionally or alternatively, in an embodiment, the data portion 354 includes a subchannel, sometimes referred to as a control subchannel, allocated for transmission of a broadcast trigger frame directed to multiple client stations 25. In this embodiment, at least some of the client stations 25 that are triggered for uplink OFDMA transmission by the trigger frame in the data unit 350 can be different from client stations 25 to which data is transmitted in the data unit 350.

Figure 4:
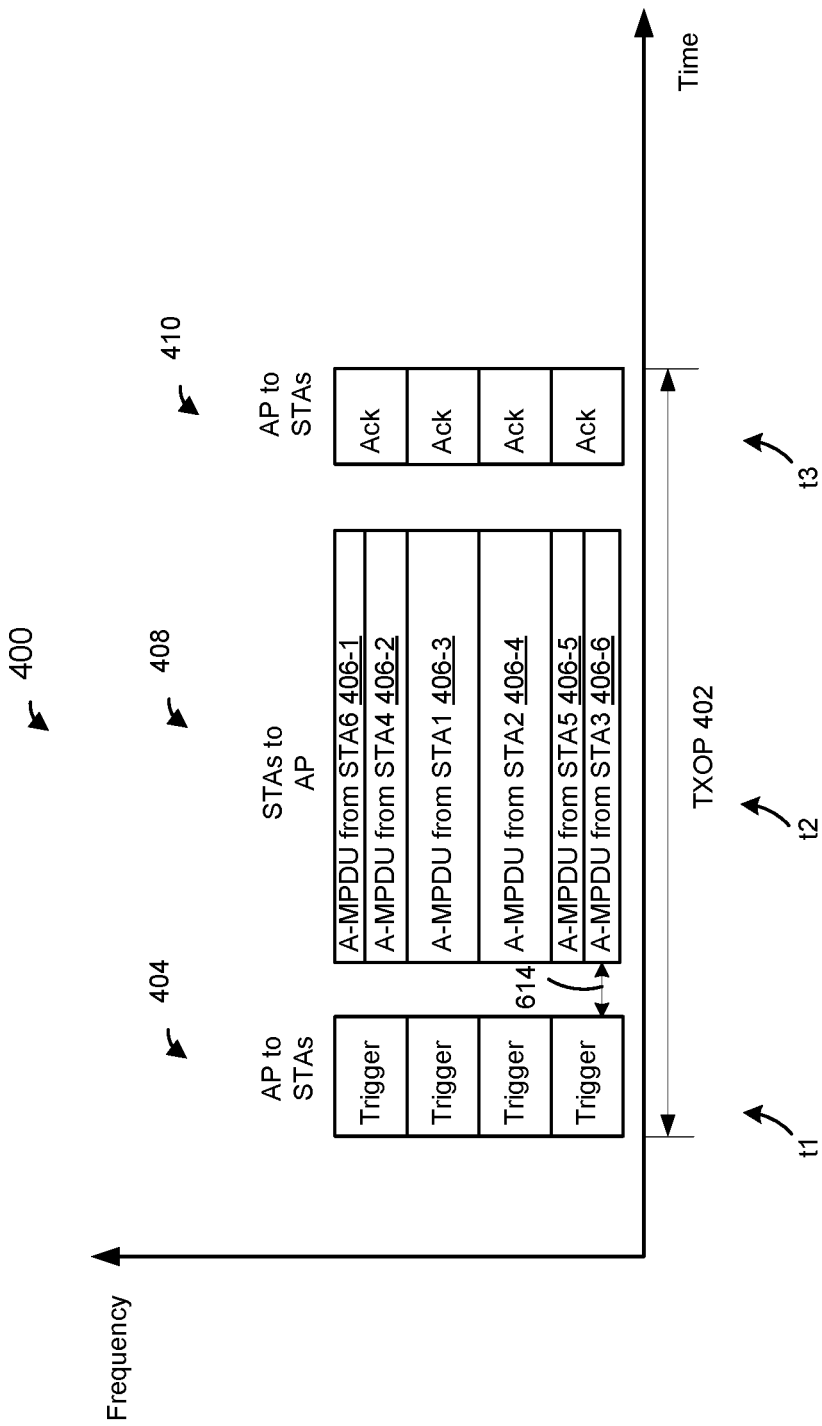
FIG. 4 is a diagram of an example transmission sequence in a WLAN, according to an embodiment.

FIG. 4 is a diagram of an example transmission sequence 400 in a WLAN, such as the WLAN 10 of FIG. 1, according to an embodiment, in which an AP, such as the AP 14, triggers a UL OFDMA transmission by multiple client stations, such as multiple ones of the client stations 25, during a transmission opportunity period (TXOP) 402. During a time t1, the AP 14 transmits a trigger frame 404 to a plurality of client stations 25. In an embodiment, the time t1 begins at the beginning of a TXOP obtained by (e.g., based on a suitable channel assessment procedure, such as a carrier sense multiple access with collision avoidance (CSMA/CA) procedure, a backoff procedure, etc.), or scheduled for, the AP 14. In an embodiment, the trigger frame 404 provides, to the plurality of client stations 25, resource unit allocation indications and other transmission parameters to be used for transmission of an uplink OFDMA data unit during the TXOP 402. In an embodiment, the trigger frame 404 is a MAC control frame that includes the uplink transmission information. In an embodiment, the MAC control frame is included in a data portion a data unit, such as the data portion 304 of the data unit 300 of FIG. 3A. In an embodiment, the trigger frame 404 is included in a physical layer convergence protocol (PLCP) protocol data unit (PPDU), such as a legacy PPDU that conforms to the IEEE 802.11a, the IEEE 802.11n, the IEEE 802.11ac and/or IEEE 802.11g Standard, for example. In an embodiment, the trigger frame the trigger frame 404 is included in a physical layer convergence protocol (PLCP) protocol data unit (PPDU) that conforms to the first communication protocol (e.g., the IEEE 802.11ax Standard). In some embodiments, the trigger frame 404 is a null data packet (NDP) that includes uplink transmission information in a preamble, and omits a data portion.

In an embodiment and/or scenario, the trigger frame 404 is duplicated in each channel (e.g., in each 20 MHz channel) of the entire bandwidth of the TXOP 402. In an embodiment in which the trigger frame 404 is included in a legacy PPDU which is duplicated each channel (e.g., in each 20 MHz channel) of the entire bandwidth of the TXOP 402, communication medium is protected from interference by any device in the network over the entire bandwidth of the TXOP 402, at least for the duration defined by a Duration field of the trigger frame 404, or for the duration of the entire TXOP 402. In another embodiment and/or scenario, the trigger frame 404 occupies the entire bandwidth of the TXOP 402, for example when each of the client stations 25 to which the trigger frame 404 is transmitted is capable of operating in the entire bandwidth of the TXOP 402. In an embodiment, a trigger frame that occupies the entire bandwidth of the TXOP 402 is relatively shorter, and accordingly is transmitted in a relatively shorter time period, compared to a trigger frame that is duplicated in each narrowest (e.g., 20 MHz) channel bandwidth of the TXOP 402.

The trigger frame 404 indicates respective subchannels allocated for uplink OFDMA transmission by six client stations STA1 through STA 6, in the illustrated embodiment. During a time t2, client stations STA1 through STA 6 transmit respective OFDM data unit, such as an A-MPDUs, 406 as parts of an OFDMA transmission 408 to the AP 14. In an embodiment, each A-MPDU 406 is included in a physical layer data unit transmitted by a corresponding client station 25. In an embodiment, the OFDMA transmission 408 has a format the same as or similar to the format of the data unit 350 of FIG. 3B. In another embodiment, the OFDMA transmission 408 has a suitable format different from the format of the data unit 350 of FIG. 3B.

Time t2 at each client station 25 begins upon expiration of a predetermined time interval, such as for example a time interval corresponding to a short inter-frame space (SIFS), after completion of reception of the trigger frame 404 at the client station 25, in an embodiment. In another embodiment, a predetermined time period that is greater than SIFS is defined, and time t2 at each client station 25 begins upon expiration of a predetermined time interval corresponding to the predetermined time interval greater than SIFS. For example, a predetermined time period that is greater than SIFS and less than point coordination function (PCF) inter-frame space (PIFS) is defined. The greater predetermined time interval may provide sufficient time for the client stations 25 to decode the trigger frame 404 and to prepare for uplink transmission based on the uplink scheduling information provided by the trigger frame 404, in at least some embodiments. Additionally or alternatively, the trigger frame 404 includes a padding portion, having one or more one or more padding bits, at the end of the trigger frame 404 and before an error detection code field, e.g., a field check sequence (FCS) field, of the trigger frame 404 to provide sufficient time for the client stations 25 to prepare for uplink transmission (which includes performing a clear channel assessment (CCA) procedure) based on the uplink scheduling information provided by the trigger frame 404, in some embodiments and/or scenarios. In an embodiment, if the padding portion is included in the trigger frame 404, then the padding portion includes at least two octets of padding bits (i.e., at least 16 padding bits). In other embodiments, the padding portion includes other suitable minimum numbers of padding bits. In an embodiment, a MAC header or an MPDU delimiter field included in the data unit that includes the trigger frame 404 indicates a length of a valid payload, wherein the one or more padding bits follow the valid payload. In another embodiment, a specific padding pattern, e.g. a reserved AID value in the rage of 2008 to 2047, can be used for padding where a STA detects the end of a valid payload once the specific pattern is reached. Further, a signal field of a PHY preamble of the trigger frame 404 includes an indication of the entire length of the trigger frame 404, which includes the one or more padding bits at the end of the trigger frame 404 and before an error detection code field, e.g., an FCS field, of the trigger frame 404, in an embodiment. A client station 25 determines based on the length indications included with the trigger frame 404, or based on the specific padding pattern in the trigger frame 404, which portion of the payload includes padding bits, and stops decoding the payload when it reaches the portion that includes the padding bits, in an embodiment. As such, the one or more padding bits provide "buffer" time that allows the client station 25 to process the trigger frame 404 before trigger frame 404 is entirely received by the client station 25.

In an embodiment, each client station transmits its OFDM data unit 406 during the time t2 in a respective subchannel, allocated to the client station, as indicated in the trigger frame 404. In an embodiment, each client station transmits its OFDM data unit using transmission parameters, such as a modulation and coding scheme, a coding type, transmission power, length or duration of the data unit, etc. indicated in the trigger frame 404. In another embodiment, at least some of the client stations transmit OFDM data unit using at least some transmission parameters, such as a modulation and coding scheme, a coding type, transmission power, length or duration of the data unit, etc. determined by the client stations and not indicated in the trigger frame 404.

During a time t3, the AP 14 transmits respective acknowledgement frames 410 to the client stations 25 (STA1 through STA6) acknowledging receipt of the OFDM data units 406 from the client stations 25. In an embodiment, each of one or more of the respective acknowledgement frames 410 is an ACK frame. In another embodiment, each of one or more of the respective acknowledgement frames 410 is a block ACK (BA) frame. In yet another embodiment, each of one or more of the respective acknowledgement frames 410 is an multi-station block ACK (Multi-STA BA) frame. In still another embodiment, the AP 14 transmits a broadcast acknowledgement frame that includes respective acknowledgements for the client stations 25 (STA1 through STA6). Time t3 begins upon expiration of a predetermined time interval, such as for example a time interval corresponding to a short inter-frame space (SIFS), after completion of reception of the OFDM data units 406 at the AP 14, in an embodiment. In an embodiment, the AP 14 transmits the acknowledgement frame 410 to the client stations 25, as parts of an OFDMA transmission to the client statins 25, in the respective subchannels allocated to the client stations 25 indicated in the trigger frame 404.

Figure 5:
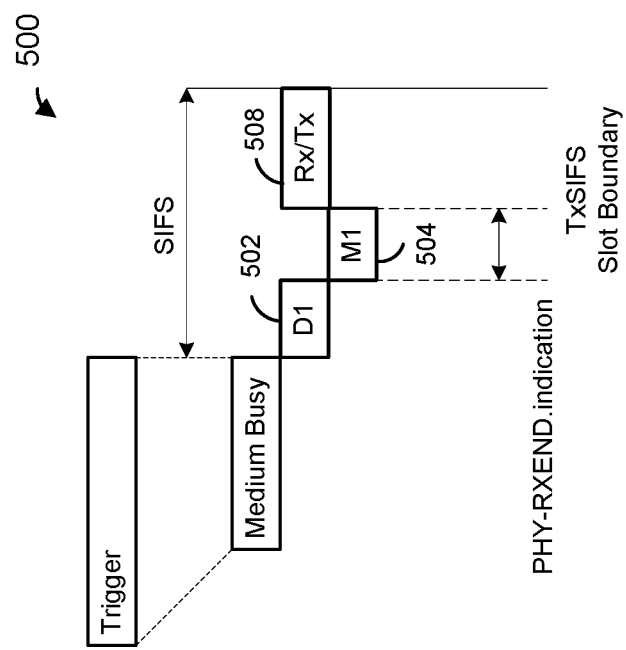
FIG. 5 is a block diagram that illustrates an interframe space time interval, according to an embodiment.

FIG. 5 is a block diagram that illustrates an interframe space time interval 500, according to an embodiment. In an embodiment, the time interval 500 corresponds to the time interval 414 of FIG. 4. The time interval 500 corresponds to a short interframe space (SIFS), in an embodiment. The time interval 500 begins at a client station 25 after reception of an independently transmitted trigger frame or of a downlink transmission that includes a trigger frame (or trigger frames) as indicated, for example, by a PHY-RXEND.indication generated by a PHY processor of the client station 25, in an embodiment. The time interval 500 includes a D1 time interval 502, an M1 time interval 504, and an Rx/Tx time interval 508. The D1 time interval 502 and the M1 time interval 504 correspond to a PHY processing delay and a MAC processing delay, respectively, in an embodiment. The Rx/Tx time interval 508 corresponds to a transceiver turn-around time, or a time interval needed for switching from transmit mode to receive mode and back to transmit mode, in an embodiment.

In an embodiment, depending on capabilities of respective client stations 25, in the time interval 500 it may be difficult or not possible for one or more client stations 25 to generate and prepare for uplink transmission to the AP 14 after receiving the trigger frame 400 from the AP 14. In an embodiment, various parameters regarding the trigger frame 400 and/or the uplink transmission are provided in the trigger frame 400 in a manner that allows a client station 25 to quickly determine the parameters based on the indications included in the trigger frame 400, for example before the client station 25 receives the entire trigger frame 400. For example, in an embodiment, the trigger frame 400 includes an indication that the trigger frame 400 is a trigger frame, and not a control frame of a subtype other than a trigger frame, in an early portion of the trigger frame 400. As another example, in an embodiment, the data unit that includes the trigger frame 400 includes, in an early portion of the data unit, an indication of a bandwidth of the uplink transmission being triggered by the trigger frame 400. A client station 25 utilizes the bandwidth indication included in an early portion of the data unit that includes the trigger frame 400 to begin preparing a corresponding preamble portion of the uplink transmission, for example, in an embodiment.

Figures 6A, 6B:
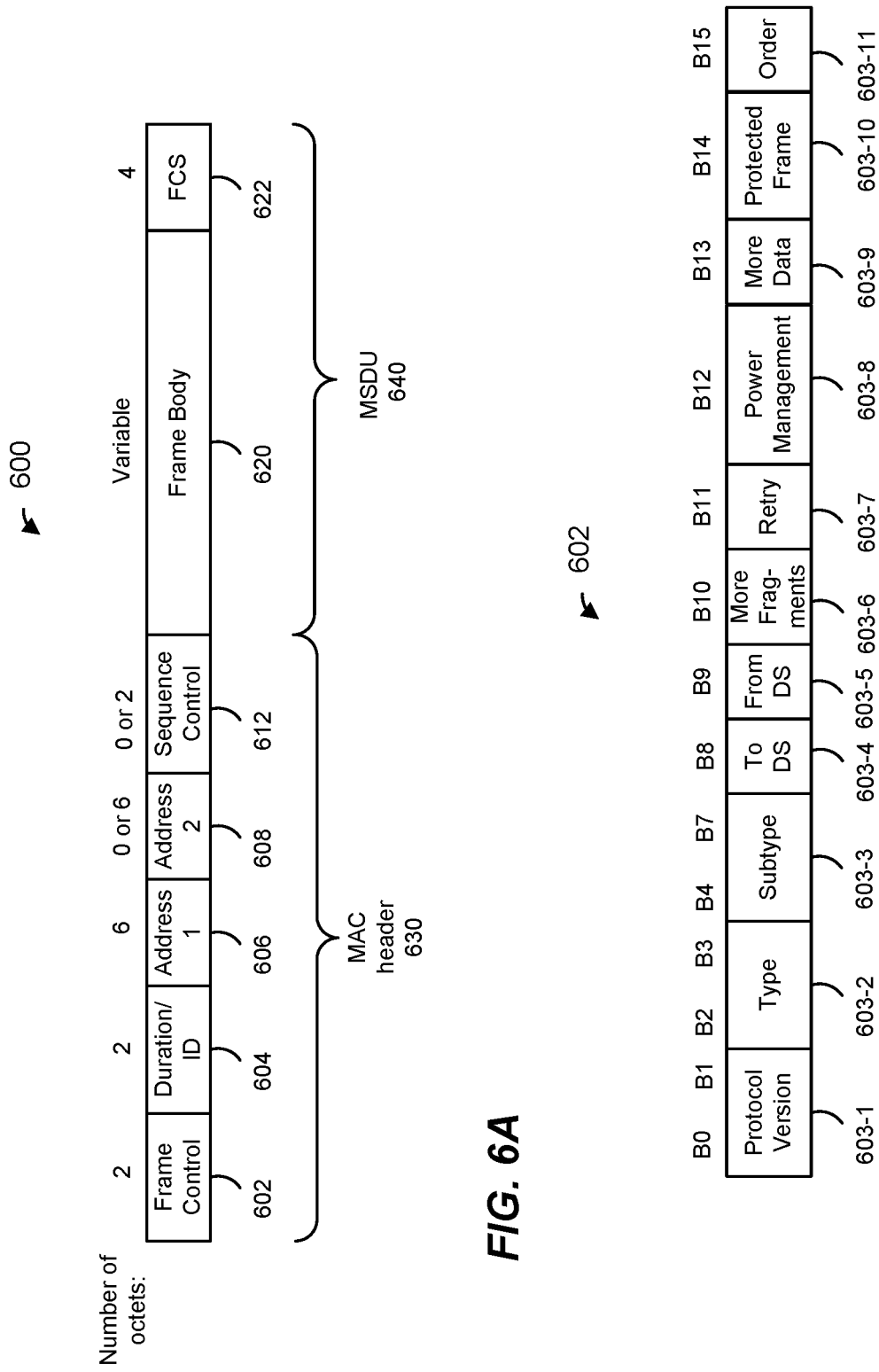
FIG. 6A is a block diagram of a trigger frame, according to an embodiment.
FIG. 6B is a block diagram of a frame control field of a control frame, according to an embodiment.

FIG. 6A is a block diagram of a trigger frame 600, according to an embodiment. The trigger frame 600 is a MAC control frame included in a physical layer data unit transmitted by the AP 14 to a plurality of client stations 25, in an embodiment. In an embodiment, the trigger frame 600 is included in the data portion 302 of FIG. 3A. In an embodiment, the trigger frame 600 corresponds to the trigger frame 402 of FIG. 4. In other embodiments, the trigger frame 600 is included in suitable physical layer data units different from the data unit 300 of FIG. 3A or the trigger frame 402 of FIG. 4. The trigger frame 600 includes a plurality of fields, including a frame control field 602, a duration/ID field 604, a first address field (e.g., a receiver address (RA) field) 606, a second address field (e.g., a transmitter address (TA) field) 608, a sequence control field 612, a frame body field 620 and a frame check field 622. The number of octets of bits allocated to each field of the trigger frame 600, according to an example embodiment, is indicated in FIG. 6A above the corresponding field. In an embodiment, the frame control field 602, the duration/ID field 604, the first address field (e.g., a receiver address (RA) field) 606, the second address field (e.g., a transmitter address (TA) field) 608, and the sequence control field 612, comprise a MAC header 242 of the trigger frame 600. In an embodiment, the frame body 620 and the FCS 622 comprise an MSDU portion 640 of the trigger frame 600.

FIG. 6B is a block diagram of the frame control field 602 of the control frame 600, according to an embodiment. The frame control field 602 includes a plurality of subfields 603. Bits within the frame control field 602 allocated to each subfield 603, according to an embodiment, are indicated in FIG. 6B above the corresponding subfield 603. The plurality of subfields 603 include a protocol version subfield 603-1, a type subfield 603-2, a subtype subfield 603-3, a to DS subfield 603-4, a from DS subfield 603-5, a more fragments subfield 603-6, a retry subfield 603-7, a power management subfield 603-8, a more data subfield 603-9, a protected frame subfield 603-10, and an order subfield 603-11. The type subfield 603-2 indicates that the frame 600 is a control frame and the subtype subfield 603-3 indicates a subtype of the frame 600, in an embodiment. Referring briefly to FIG. 7, a table 700 illustrates various values of a subtype subfield of a control field and corresponding control frame subtypes indicated by the subtype subfield of the control frame as defined in the IEEE 802.11ac Standard. In an embodiment, to indicate that the control frame 600 is a trigger frame, the subtype subfield 603-3 of the trigger frame 600 is set to indicate control frame extension (e.g., value of "0110" as illustrated in FIG. 7), and bits B8 to B11 are set to a value that indicates that the control frame 600 is a trigger frame as defined by the HE communication protocol, in an embodiment.

In another embodiment, information that indicates that the frame 600 is a trigger frame is contained in an earlier portion of the frame control field 602. For example, in an embodiment, information that indicates that the frame 600 is a trigger frame is contained in an initial portion of the frame control field 602, such as within the first eight bits of the frame control field 602. In an embodiment, including information that indicates that the frame 600 is a trigger frame in an initial portion of the frame control field 602 results in this information being entirely included in the first OFDM symbol of the data portion of the data unit 200. In an embodiment, the type subfield 603-2 (i.e., bits B2-B3) of the frame control field 602 is set to indicate that the frame 600 is a control frame, and the subtype subfield 603-3 (i.e., bits B4-B7) of the frame control field 602 is set to indicate that the control frame 600 is a trigger frame. For example, the subtype subfield 602-3 is set to a value that is reserves according to the legacy communication protocol, such as a value in the range 0000-00011 that is reserved according to the IEEE 802.11ac Standard as illustrated in the first row of the table 700 of FIG. 7, to indicate that the control frame 600 is a trigger frame in an embodiment. Accordingly, the information that indicates that the frame 600 is a trigger frame is included within the first eight bits of the frame 600, in this embodiment.

Referring to FIGS. 6A and 2B, the MAC header 630 corresponds to the MAC header 254. Referring still to FIGS. 6A and 2B, the service field 252 and an initial portion of the MAC header 630 correspond to the first OFDM symbol of the data portion 240, in an embodiment. For example, in an embodiment in which a lowest MCS (e.g., MCS0) defined by the first communication protocol is used for transmission of the data portion 240, the first OFDM symbol of the data portion 240 includes 24 information bits, of which sixteen bits correspond to the service field 254 and eight bits correspond to the first eight bits of the MAC header 630. Accordingly, in an embodiment in which information bits that indicate that the frame 600 is a trigger frame are included in the first eight bits of the frame control field 602, this information is then included in the first OFDM symbol of the data portion 240. In an embodiment, a receiving device that receives the data unit 200 determines that the data unit 200 includes a trigger control frame upon receiving and decoding the first OFDM symbol of the data portion 240 of the data unit 200. In response to determining that the data unit 200 includes a trigger control frame, the receiving device initiates preparation for uplink transmission such that at least some operations related to preparation for uplink transmission are performed before the receiving device receives subsequent portions of the data unit 200, such as before the receiving device receives and decodes the second OFDM symbol of the data portion 240 of the data unit 200, in an embodiment.

In some embodiments, in addition to or instead of using early trigger frame indication and/or early uplink transmission bandwidth indication, trigger frame padding and/or a larger interframe space is used to provide receiving devices additional time to prepare for uplink transmission in at least some embodiments. In an embodiment, client stations 25 provide to the AP 14 indications of time duration required by the client stations 25 to prepare an uplink transmission upon receiving a trigger frame. For example, the client stations 25 provide to the AP 14 indications of time durations between the end of a data unit that includes a trigger frame and a beginning of transmission by the client station 25 of an uplink data unit triggered by the trigger frame. Based on time duration requirements received from client stations 25 being triggered by a tiger frame, the AP 14 determines whether a longer interframe space and/or padding is needed to provide sufficient time for the client stations 25 to prepare the uplink transmission triggered by the trigger frame, in an embodiment.

In an embodiment, a client station 25 provides its time duration requirements to the AP 14 by transmitting a management frame to the AP 14, wherein the management frame includes a capabilities element such as an HE capabilities field. The HE capabilities field includes a trigger frame (TF) MAC padding duration capability indication, in an embodiment. a trigger frame (TF) MAC padding duration capability indication is set to indicate one of zero (0) microseconds (μs), eight (8) μs or sixteen (16) μs. In an embodiment, when the AP 14 is to transmit a trigger frame to a group of client stations 25, the AP 14 determines a number of padding bits to be included in a padding portion of the trigger frame based at least in part on TF MAC padding duration capability indications received from the client stations 25 in the group. More specifically, in an embodiment, the AP 14 determines a number of padding bits to be included in the padding portion the trigger frame based on a longest value of the TF MAC padding duration capability indications received from the client stations 25 in the group, such that a duration of the padding portion is equal to or greater than the longest value of the TF MAC padding duration capability indications (e.g., 8 μs or 16 μs) received from the client stations 25 in the group. The AP 14 then adds the padding portion to the trigger frame, in an embodiment. In some embodiments, the padding portion results in one or more additional OFDM symbols in the trigger frame. As an example, a padding portion corresponding to the duration of 16 μs being transmitted in a PDDU that conforms to the first communication protocol (e.g., IEEE 802.11ax Standard) results in at least one additional OFDM symbol in the trigger frame, in an embodiment.

Figure 8:
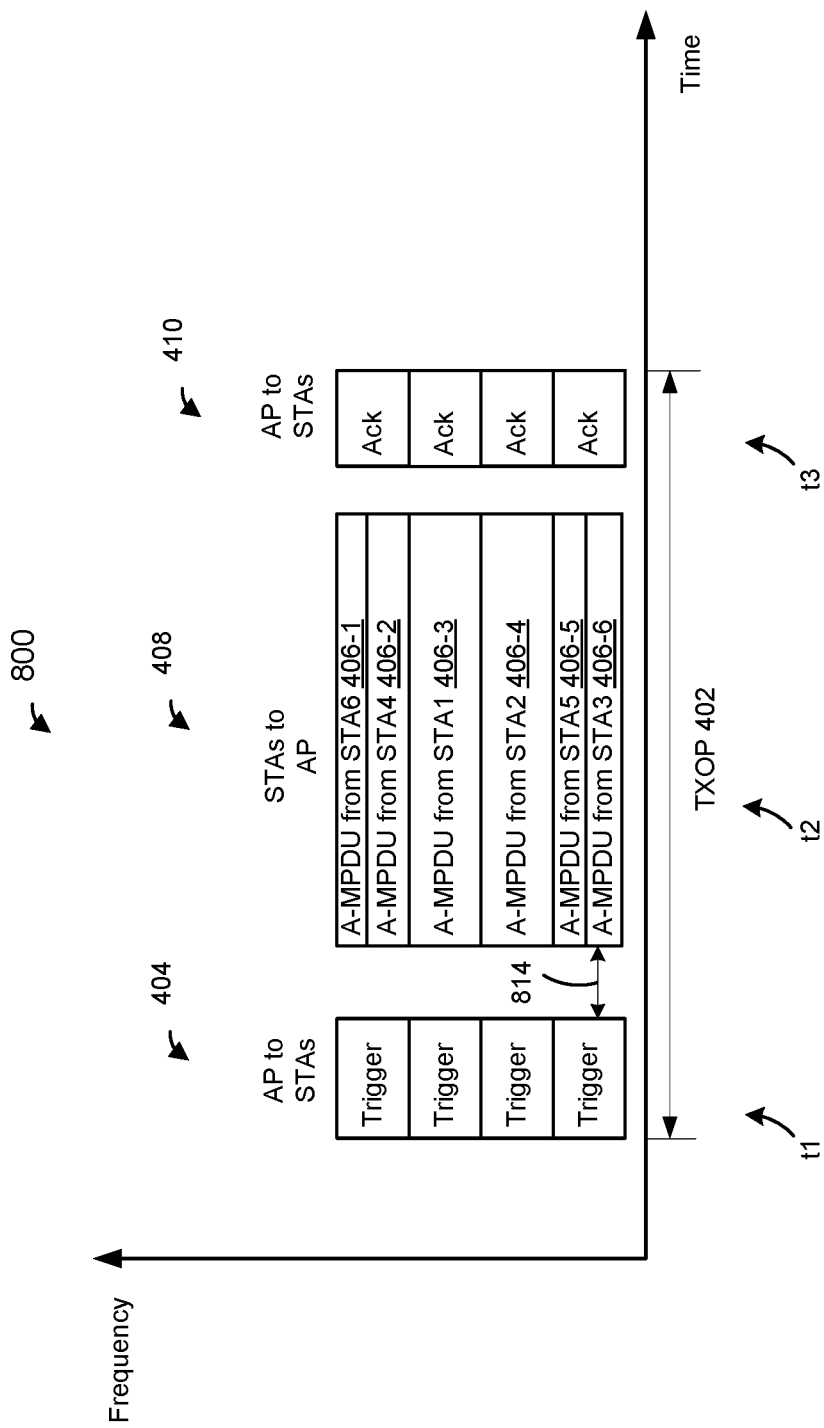
FIG. 8 is a diagram of an example transmission sequence in a WLAN, according to an embodiment.

FIG. 8 is a diagram of an example transmission sequence 800 in a WLAN, such as the WLAN 10 of FIG. 1, according to an embodiment, in which a variable interframe space is used for triggered uplink transmission. The transmission sequence 800 is generally the same as the transmission sequence 400 of FIG. 4. In the transmission sequence 800, the time t2 during which the client stations STA1 through STA6 transmit their uplink data units 406 begins upon expiration of a time interval corresponding to an interframe space 814 between the end of the trigger frame 404 and the beginning of the time interval t2. In an embodiment, the AP 14 determines the interframe space 814 based on time duration requirements received from the client stations STA1 through STA6. For example, in an embodiment, the AP 14 sets the interframe space 814 to a longest time duration requirement of the respective time duration requirements received from client stations STA1 through STA6. In an embodiment, the AP 14 announces the value of the interframe space 814 to the client stations STA1 through STA6. The AP 14 announces this interframe space to the STA1 through STA6 for example by including an indication of the value of the interframe space 814 in the trigger frame 404 or in a preamble (e.g., a signal field) of a data unit that includes the trigger frame 404, in an embodiment.

In another embodiment, the AP 14 determines, based on the time duration requirement of the client stations 25 being triggered by a trigger frame, a number of padding bits or a number of padding OFDM symbols to be added to the trigger frame to provide sufficient time for the client stations 25 to prepare for uplink transmission being triggered by the trigger frame. The AP 14 generates the data unit that includes the trigger frame to include the determined number of padding bits or padding OFDM symbols after the trigger frame or after the data unit that includes the trigger frame, in various embodiments.

Figure 9:
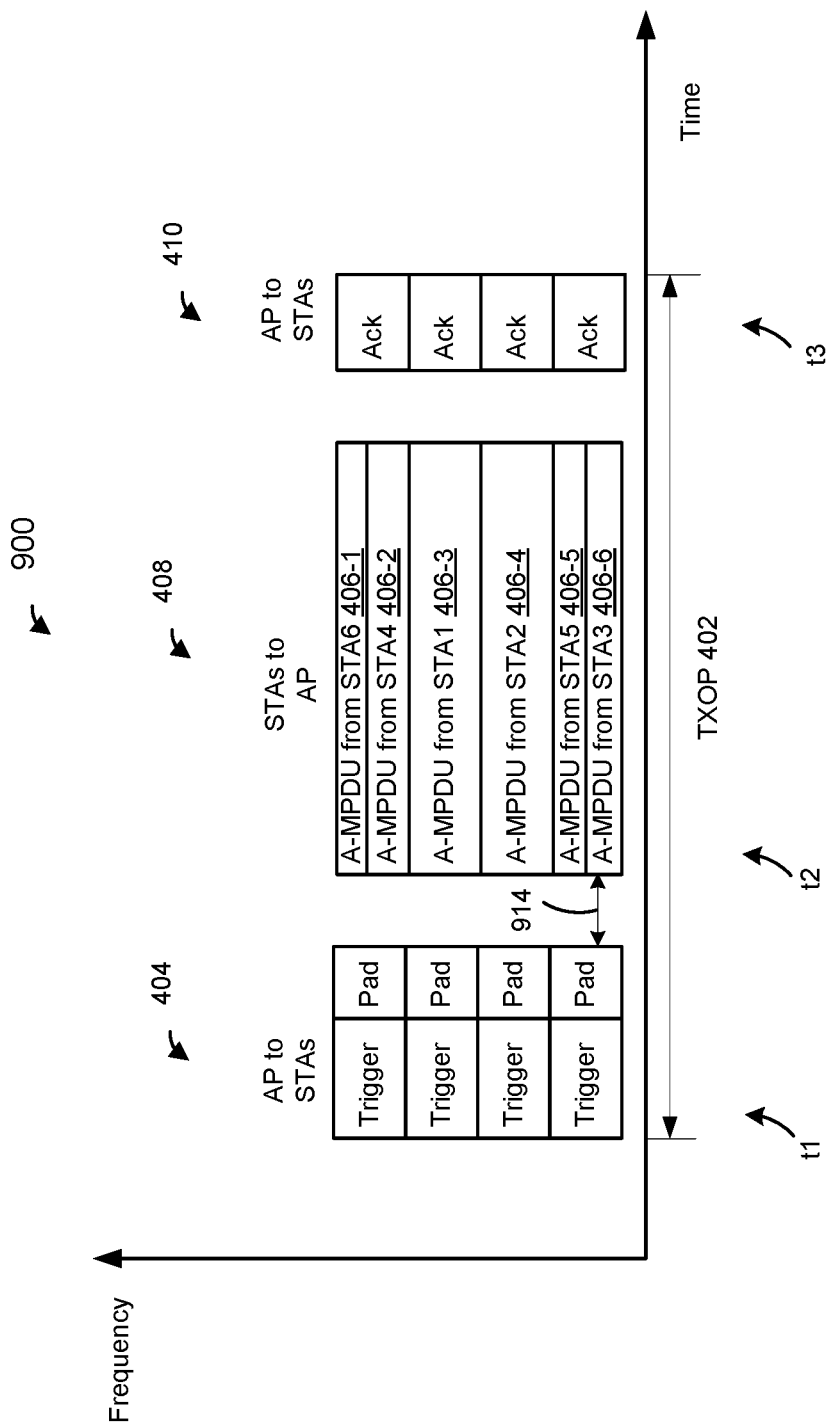
FIG. 9 is a diagram of an example transmission sequence in a WLAN, according to another embodiment.

FIG. 9 is a diagram of an example transmission sequence 900 in a WLAN, such as the WLAN 10 of FIG. 1, according to an embodiment, in which a fixed interframe space is used for triggered uplink transmission. The transmission sequence 900 is generally the same as the transmission sequence 400 of FIG. 4. In an embodiment, the trigger frame 404 includes a padding portion 902 to provide sufficient time for the client stations STA1 through STA6 to prepare for uplink transmission triggered by the trigger frame 404. In an embodiment, the padding portion 902 includes a number of padding bits (e.g., at least two octets, i.e., at least 16, padding bits) or a number of padding OFDM symbols appended to the trigger frame 404 or to the data unit that includes the trigger frame 404. In the transmission sequence 900, the time t2 during which the client stations STA1 through STA6 transmit their uplink data units 406 begins upon expiration of a time interval corresponding to an interframe space 914 between the end of the trigger frame 404 and the beginning of the time interval t2. In an embodiment, the interframe space 914 is a predetermined time interval. For example, in an embodiment, the interframe space 914 is SIFS. In another embodiment, the interframe space 914 is a suitable predetermined interframe space time interval different from SIFS.

The AP 14 determines the number of padding bits and/or padding OFDM symbols to be included in padding portion 902 based on time duration requirements received from the client stations STA1-STA6, in an embodiment. For example, the AP14 determines the number of padding bits and/or OFDM symbols needed to ensure that the sum of a time duration of transmission of the padding portion 902 and the time interval 914 (e.g., SIFS) is greater than or equal to the longest time duration requirement of the client stations STA1 through STA6. In an embodiment in which the AP14 determines a number of padding OFDM symbols to be included in the padding portion 902, the time that the client stations STA1 through STA6 are provided for preparing for uplink transmission triggered by the trigger frame 404 corresponds to SIFS+n*(time duration of an OFDM symbol), wherein the time duration of an OFDM symbol is 3.6 s, for example, and wherein n is an integer corresponding to the number of padding OFDM symbols. In another embodiment in which the AP14 determines a number of padding OFDM symbols to be included in the padding portion 902, the time that each client station STA1 through STA6 are provided for preparing for uplink transmission triggered by the trigger frame 404 corresponds to SIFS+n*(time duration of an OFDM symbol)+time duration corresponding to any OFDM symbols of per-user/group subfields of the trigger frame 404 after the per-user/group subfield that includes information for the corresponding client station STA1 through STA6, wherein time duration of an OFDM symbol is 3.6 s, for example, and wherein n is an integer corresponding to the number of padding OFDM symbols.

Figure 10:
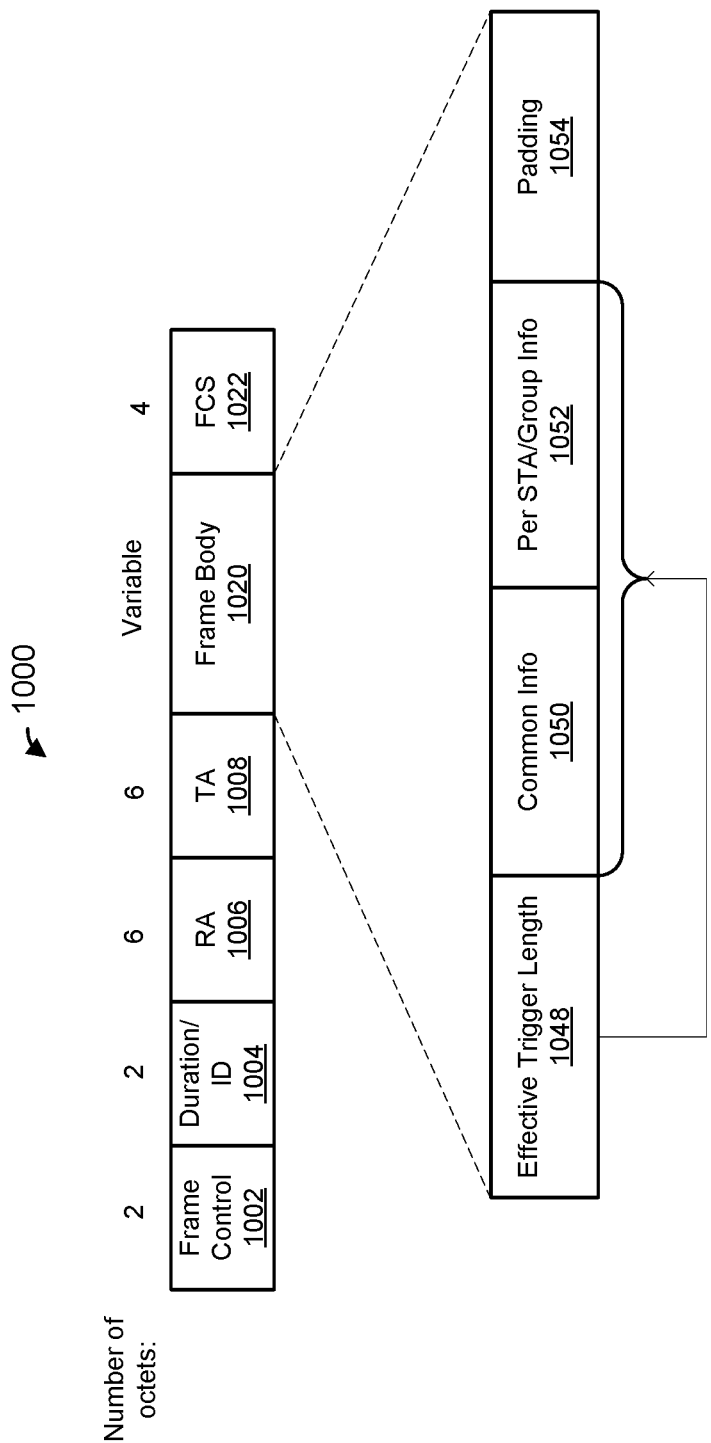
FIG. 10 is a block diagram of a tiger frame that includes padding, according to an embodiment.

FIG. 10 is a block diagram of a tiger frame 1000 that includes padding, according to an embodiment. In an embodiment, the trigger frame 1000 corresponds to the trigger frame 404. In an embodiment, the trigger frame 1000 is generally the same as or similar to the trigger frame 600 of FIG. 6A. The trigger frame 1000 includes a plurality of fields, including a frame control field 1002, a duration/ID field 1004, a first address field (e.g., a receiver address (RA) field) 1006, a second address field (e.g., a transmitter address (TA) field) 1008, a frame body field 1020 and a frame check field 1022. The number of octets of bits allocated to each field of the trigger frame 1000, according to an example embodiment, is indicated in FIG. 10 above the corresponding field. The frame body 1020 includes an effective trigger length indicator 1048, a common information subfield 1050, one or more per-user/group subfields 1052 and a padding portion 1054. The effective trigger length indicator 1048 indicates a length or duration corresponding to the length or duration of the common information field 1050 and the one or more per-user/group subfields 1052, in an embodiment. The padding portion 1054 corresponds to the padding portion 902 of FIG. 9, in an embodiment. The padding portion 1054 is included in the trigger frame 1000 before the FCS field 1022, in an embodiment.

Figure 11:
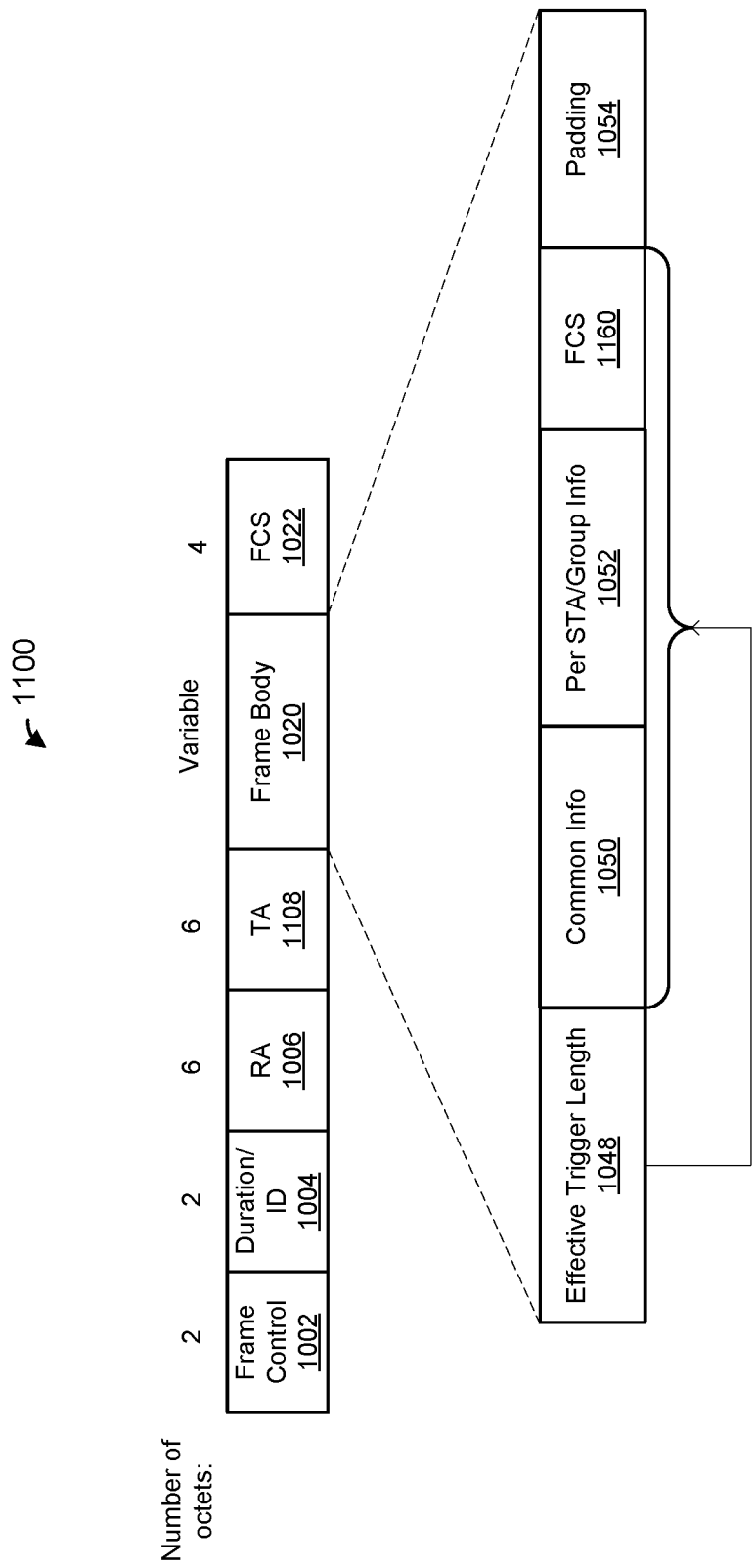
FIG. 11 is a block diagram of a tiger frame that includes padding, according to another embodiment.

FIG. 11 is a block diagram of a tiger frame 1100 that included one or more (e.g., 16 or more) padding bits or padding OFDM symbols, according to another embodiment. In an embodiment, the trigger frame 1000 corresponds to the trigger frame 404. The trigger frame 1100 is generally the same as the trigger frame 1000 of FIG. 10 except that in the trigger frame 1100 includes an FCS field 1160 before the padding portion 1054. The effective trigger length indicator 1048 indicates a length or duration corresponding to the length or duration of the common information field 1050, the one or more per-user/group subfields 1052 and the FCS field 1060, in an embodiment. Client stations that are configured to operate according to the first communication protocol are configured to stop decoding the trigger frame 1100 after decoding the FCS field 1160, in an embodiment. On the other hand, legacy client stations that are not configured to operate according to the first communication protocol continue decoding the trigger frame 1100 until the end of the FCS field 1022, in an embodiment.

In an embodiment, the AP 14 determines a number of padding bits to be included in a trigger frame (e.g., in the padding portion 1054 of the trigger frame 1000, 1100) using an effective trigger frame length. In an embodiment, the effective trigger frame length of the trigger frame is determined based on a number of the client stations 25 being triggered by the trigger frame. In an embodiment in which an FCS field is included in a frame body of the trigger frame before the padding portion, such as in the trigger frame 1100 of FIG. 11, the effective length of the trigger frame includes the FCS field (e.g., a four-byte FCS field). To determine the number of padding bits, in an embodiment, the AP 14 first determines an initial number of OFDM symbols needed to include the trigger frame according to $$N_{SYM1} = \left\lceil \frac{8 \cdot \text{Length}_{\textit{eff}} + 16}{N_{DBPS}} \right\rceil \quad \text{Equation 1}$$

where $\text{Length}_{\textit{eff}}$ is the effective length of the trigger frame in bytes and $N_{DBPS}$ is the number of data bits per OFDM symbol. In an embodiment, the AP 14 then determines a first number of padding bits according to $$N_{PAD1} = N_{SYM1} \cdot N_{DBPS} - 8 \cdot \text{Length}_{\textit{eff}} - 16 \quad \text{Equation 2}$$

The AP 14 also determines a number of second padding bits needed to entirely fill a total number of OFDM symbols need to include the padded trigger frame. In an embodiment, the AP 14 determines the number of second padding bits according to $$N_{PAD2} = (N_{SYM} - N_{SYM1}) \cdot N_{DBPS} - 32 - 6 \quad \text{Equation 3}$$

The AP 14 then determines the total number of padding bits in the padding portion by summing the number of first padding bits $N_{PAD1}$ determined according to Equation 2 and the number of second padding bits $N_{PAD2}$ determined according to Equation 3, in an embodiment.

Alternatively, in another embodiment, the AP 14 determines the number of padding bits to be included in be included in the trigger frame (e.g., in the padding portion 1054 of the trigger frame 1000, 1100) directly according to $$N_{PAD} = N_{SYM} \cdot N_{DBPS} - 8 \cdot \text{Length}_{\textit{eff}} - 16 - 32 - 6 \quad \text{Equation 4}$$

In an embodiment, $N_{SYM}$ in Equations 3 and 4 is a total number of OFDM symbols need to include the padded trigger frame. In an embodiment, the AP 14 determines $N_{SYM}$ according to $$N_{SYM} = N_{SYM1} + N_{SYM,extra} \quad \text{Equation 5}$$

where $N_{SYM1}$ is determined according to Equation 1, and $N_{SYM,extra}$ is a number of padding OFDM symbols determined, for example, based on time duration requirements received from the multiple client stations being triggered by the trigger frame.

In another embodiment, the AP 14 determines $N_{SYM}$ based on a minimum number of padding bits ($N_{PAD2}$ in Equation 3 or $N_{PAD}$ in Equation 4) according to $$N_{SYM} = N_{SYM1} + \left\lceil \frac{32 + 6 + N_{PAD2,min}}{N_{DBPS}} \right\rceil \quad \text{Equation 6}$$

In some embodiments, the AP 14 determines, based on a longest one of time duration requirements (e.g., TF MAC padding capabilities indications) received from client stations 25 being triggered by a trigger frame, a length of a padding portion to be included in the trigger frame. In an embodiment, if the trigger frame is to be transmitted in a legacy PPDU, the AP 14 determines the length of a padding portion to be included in the trigger frame, in bytes, according to $$L_{PAD,MAC} = \left\lceil \frac{N_{DBPS} \cdot m_{PAD}}{8} \right\rceil \quad \text{Equation 7}$$

where $N_{DBPS}$ is the number of data bits per OFDM symbol defined by the legacy communication protocol, and $$m_{PAD} = \begin{cases} 0, & \text{if longest time duration requirement is 0 µs} \\ 2, & \text{if longest time duration requirement is 8 µs} \\ 4, & \text{if longest time duration requirement is 16 µs} \end{cases}$$

On the other hand, continuing with the same embodiment, if the trigger frame is to be transmitted in a non-legacy PPDU, such as a PPDU that conforms to the first communication protocol (e.g., IEEE 802.11ax Standard), the AP 14 determines the length of a padding portion to be included in the trigger frame, in bytes, according to $$L_{PAD,MAC} = \left\lceil \frac{N_{DBPS,SHORT} \cdot m_{PAD}}{8} \right\rceil \quad \text{Equation 8}$$

where $N_{DBPS,SHORT}$ is the number of data bits per "short" OFDM symbol defined by the first communication protocol, and $$m_{PAD} = \begin{cases} 0, & \text{if longest time duration requirement is 0 µs} \\ 2, & \text{if longest time duration requirement is 8 µs} \\ 4, & \text{if longest time duration requirement is 16 µs} \end{cases}$$

In an embodiment, if the trigger frame 404 is to be included in an A-MPDU, then the AP 14 includes a padding portion having the number of padding bits determined, for example, as described above only if the trigger frame 404 is included in the last MPDU of the A-MPDU. In this embodiment, if the trigger frame 404 is not the last MPDU of the A-MPDU, then trigger frame MAC padding is not needed and is omitted from the trigger frame 404. In another embodiment, the AP 14 includes a padding portion having the number of padding bits determined, for example, as described above regardless of whether or not the trigger frame 404 is included in the last MPDU of the A-MPDU.

In an embodiment, determining a padding portion length as described above generally results in sufficient padding in the trigger frame 404 if the trigger frame 404 is encoded using block convolutional code (BCC) coding. In an embodiment, the first communication protocol allows BCC coding to be used for encoding of the trigger frame 404 and does not allow low density parity check (LDPC) coding to be used for encoding of the trigger frame 404. In another embodiment, the first communication does not allow LDPC coding to be to be used for encoding of the trigger frame 404 only if a longest one of time duration requirements (e.g., TF MAC padding capabilities indications) indicates that padding is needed in the trigger frame 404. In this embodiment, the first communication protocol allows LDPC encoding to the used encoding of the trigger frame 404 if padding is not needed on the trigger frame 404. In yet another embodiment, the first communication protocol allows LDPC coding to be to be used for encoding the trigger frame 404 even if padding is needed in the trigger frame 404. In an embodiment in which the first communication protocol allows LDPC coding to be to be used for encoding the trigger frame 404 even if padding is needed in the trigger frame 404, in addition to the MAC padding capabilities indications as described above, a client station 25 transmits to the AP 14 a TF LDPC allowance capability indication. In an embodiment, the TF LDPC allowance capability indication indicates that LDPC can be used for encoding a trigger frame transmitted to the client station 25.

In some embodiments, the first communication protocol does not allow space-time block coding (STBC) to be used for encoding the trigger frame 404, for example to reduce duration of the trigger frame 404. In another embodiment, the first communication protocol allows (STBC) to be used for encoding the trigger frame 404, for example to increase robustness of transmission of the trigger frame 404.

Figure 12:
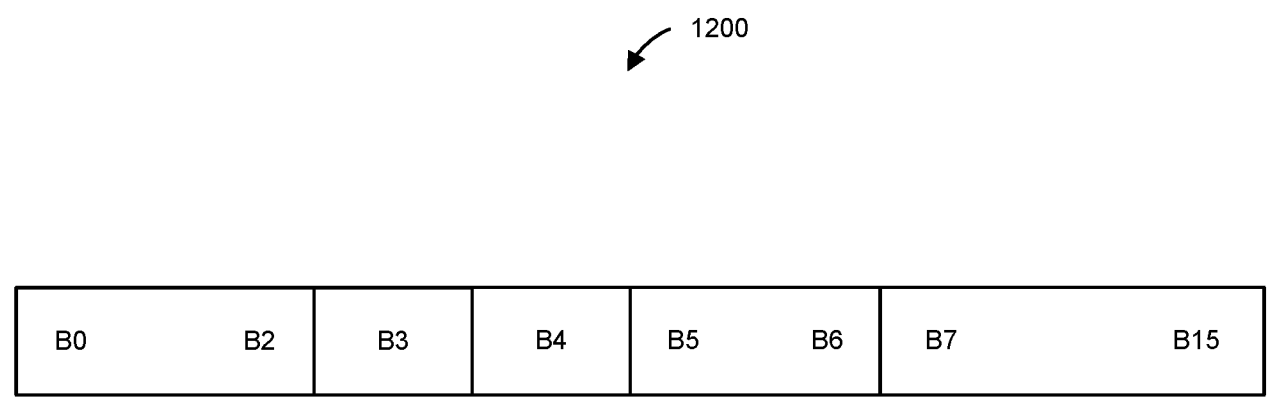

In some embodiments, service field of a data unit that includes a trigger frame (e.g., the trigger frame 404) is used to indicate one or more of (i) that the data unit includes a trigger frame, (ii) a bandwidth of an uplink transmission triggered by the trigger frame and (iii) whether the trigger frame includes padding. Indicating the one or more of (i) that the data unit includes a trigger frame, (ii) a bandwidth of an uplink transmission triggered by the trigger frame and (iii) whether the trigger frame includes padding using the service field provides early indication of these parameters to the client stations being triggered by the trigger frame to allow the client stations to begin preparation for the uplink transmission earlier as compared to embodiments in which the trigger frame itself is instead used to provide such indications, in at least some embodiments. FIG. 12 is a block diagram of a service field 1200, according to an embodiment. In an embodiment, the service field 1200 corresponds to the service field 252 of FIG. 2B. In an embodiment, bits B0-B6 of the service field 1200 are used to indicate a scrambler seed, and bits B7-B15 of the service field 1200 are reserved bits. In an embodiment, particular values of one or more of the scrambler seed bits B0-B6 as defined by the first communication protocol are used to indicate one or more of (i) that the data unit that includes the service field 1200 includes a trigger frame, (ii) a bandwidth of an uplink transmission triggered by the trigger frame and (iii) whether the trigger frame includes padding. As an example, in an embodiment, bits B5 and B6 of the service field 1200 are set to indicate a bandwidth of uplink transmission being triggered by the trigger frame, and a bit in a transmitter address field (the address field 608 of FIG. 6A or the TA field 1008 of FIGS. 10-11) is set to indicate that bandwidth indication is included in the service field 1200. In an embodiment, when bits B5-B6 of the service field 1200 indicate a bandwidth of greater than or equal to 40 MHz, then bit B4 is set to indicate whether dynamic bandwidth negotiation is supported by the AP14. Continuing with the same embodiment, B3 of the service field 1200 is set to indicate whether or not one or more padding bits or padding OFDM symbols are included in the trigger frame. For example, referring to FIGS. 10 and 11, bit B3 is set to logic one (1) to indicate that the trigger frame 1000 includes the padding portion 1054, and is set to logic zero (0) to indicate that the trigger frame 1000 omits the padding portion 1054, or vice versa, in an embodiment. Bits B0-B2 of the service field 1200 are set to indicate a pseudo-random non-zero integer to be used as the scrambler seed, in an embodiment. On the other hand, when bits B5-B6 of the service field 1200 indicate a bandwidth of 10 MHz, then bit B4 is used to indicate whether or not one or more padding bits or padding OFDM symbols are included in the trigger frame, and bits B0-B3 of the service field 1200 are set to indicate a pseudo-random non-zero integer to be used as the scrambler seed, in an embodiment.

As discussed above, in an embodiment, the service field 1200 is used to indicate that the data unit that includes the service 1200 includes a trigger frame (e.g., a control frame of a trigger frame subtype). For example, in an embodiment, one or more bits of the service field 1200 (e.g., one or more of the bits B0-B6) are set to indicate that the data unit includes a trigger frame, and a bit in a transmitter address field (the address field 608 of FIG. 6A or the TA field 1008 of FIGS. 10-11) is set to indicate that a control frame subtype indication is included in the service field 1200, in an embodiment.

Figure 13:
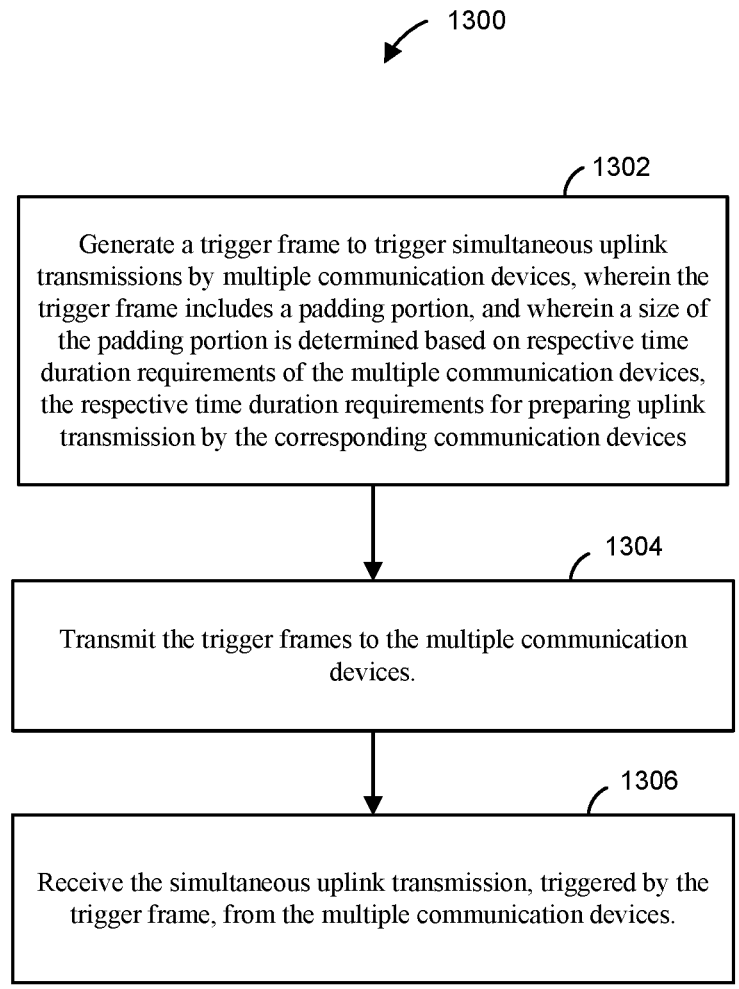
FIG. 13 is a flow diagram of an example method for communicating in a wireless communication network, according to an embodiment.

FIG. 13 is a flow diagram of an example method 1300 for communicating in a wireless communication network, according to an embodiment. In some embodiments, the method 1300 is implemented by the AP 14 (FIG. 1). For example, in some embodiments, the network interface device 16 is configured to implement the method 1300. In other embodiments, another suitable network interface device is configured to implement the method 1300.

At block 1302, a trigger frame is generated. In an embodiment, the trigger frame 404 of FIG. 4 is generated. In an embodiment, the trigger frame generated at block 1302 has format the same as or similar to the trigger frame 600 of FIGS. 6A-6B. In an embodiment, the trigger frame generated at block 1302 has format the same as or similar to the trigger frame 1000 of FIG. 10 or the trigger frame 1100 of FIG. 11. In other embodiments, other suitable trigger frames are generated. In an embodiment, the trigger frame includes a padding portion such as the padding portion 1054 of FIGS. 10 and 11. In an embodiment, a length (e.g., a number of padding bits or a number of padding OFDM symbols) of the padding portion is determined based on time duration requirements of the multiple communication devices, the time duration requirements indicating time durations needed for preparing for uplink transmission by the second communication devices.

At block 1304, the trigger frame generated at block 1302 is transmitted to the multiple communication devices.

At block 1306, the simultaneous transmissions triggered by the trigger frame are received. In an embodiment, an uplink OFDMA transmission is received, wherein the OFDMA transmission includes the simultaneous uplink transmissions, triggered by the trigger frame, in respective frequency channels allocated to respective ones of the multiple second communication devices.

In an embodiment, a method for communicating in a wireless communication network includes generating, at a first communication device, a trigger frame to trigger simultaneous uplink transmissions by multiple second communication devices, wherein the trigger frame includes a padding portion, and wherein a length of the padding portion is determined based on respective time duration requirements of the multiple second communication devices, the respective time duration requirements for preparing uplink transmission by the corresponding second communication devices. The method also includes transmitting, with the first communication device, the trigger frame to the multiple second communication devices. The method additionally includes receiving, at the first communication device, the simultaneous uplink transmissions, triggered by the trigger frame, from the multiple second communication devices.

In other embodiments, the method includes any suitable combination of one or more of the following features.

Generating the trigger frame includes appending the padding portion after one or more information fields of a frame body portion of the trigger frame and before a frame check sequence (FCS) field of the trigger frame.

The method further includes receiving, at the first communication device from the multiple second communication devices, the respective time duration requirements of the multiple second communication devices.

The method further includes determining, with the first communication device, the length of the padding portion based on the received respective time duration requirements of the multiple second communication devices.

Determining the length of the padding portion comprises determining the length of the padding portion such that a sum of (i) a time duration of a predefined interframe space between an end of the trigger frame and a beginning of the uplink transmission triggered by the trigger frame and (ii) a time duration the padding portion is equal to or greater than a longest one of the time duration requirements.

The predetermined interframe space is a short interframe frame space (SIFS).

Receiving the respective time duration requirements of the multiple second communication devices comprises receiving the respective time duration requirements during association with the corresponding second communication devices.

Determining the length of the padding portion comprises determining the length of the padding portion based on a longest one of the time duration requirements received from the second communication devices.

Determining the length of the padding portion comprises determining the length of the padding portion such that a sum of (i) a time duration of a predefined interframe space between an end of the trigger frame and a beginning of the uplink transmission triggered by the trigger frame, (ii) a time duration of the padding portion and (iii) a time duration of one or more per-user information subfields in the trigger frame after a per-user information subfield corresponding to a second communication device having the longest one of the time duration requirements, and (iv) a frame check sequence (FCS) field in the trigger frame is equal to or greater than the longest one of the time duration requirements.

Generating the trigger frame further comprises including, in the trigger frame, an indication of a beginning of the padding portion in the trigger frame.

The trigger frame is a control frame of a trigger subtype, and wherein generating the trigger frame further comprises including, in the trigger frame, an indication that the trigger frame is the control frame of the trigger subtype.

Including, in the trigger frame, the indication that the trigger frame is the control frame of the trigger subtype comprises including the indication in an initial portion of a frame control field of the trigger frame such that the indication is entirely included in a first orthogonal frequency division (OFDM) symbol that includes the initial portion of the trigger frame.

Receiving the simultaneous uplink transmissions from the multiple second communication devices comprises receiving an uplink orthogonal frequency division multiple access (OFDMA) from the multiple second communication devices, wherein the OFDMA transmission includes the simultaneous uplink transmissions, triggered by the trigger frame, in respective frequency channels allocated to respective ones of the multiple second communication devices.

In another embodiment, a first communication device comprises a network interface device having one or more integrated circuits configured to generate a trigger frame to trigger simultaneous uplink transmissions by multiple second communication devices, wherein the trigger frame includes a padding portion, and wherein a length of the padding portion is determined based on respective time duration requirements of the multiple second communication devices, the respective time duration requirements for preparing uplink transmission by the corresponding second communication devices. The one or more integrated circuits are further configured to transmit the trigger frame to the multiple second communication devices. The one or more integrated circuits are additionally configured to receive the simultaneous uplink transmissions, triggered by the trigger frame, from the multiple second communication devices.

In other embodiments, the first communication device includes any suitable combination of one or more of the following features.

The one or more integrated circuits are configured to append the padding portion after one or more information fields of a frame body portion of the trigger frame and before a frame check sequence (FCS) field of the trigger frame.

The one or more integrated circuits are further configured to receive, from the multiple second communication devices, the respective time duration requirements of the multiple second communication devices.

The one or more integrated circuits are further configured to determine the length of the padding portion based on the received respective time duration requirements of the multiple second communication devices.

The one or more integrated circuits are configured to determine the length of the padding portion such that a sum of (i) a time duration of a predefined interframe space between an end of the trigger frame and a beginning of the uplink transmission triggered by the trigger frame and (ii) a time duration the padding portion is equal to or greater than a longest one of the time duration requirements.

The predetermined interframe space is a short interframe frame space (SIFS).

The one or more integrated circuits are configured to receive the respective time duration requirements during association with the corresponding second communication devices.

The one or more integrated circuits are configured to determine the length of the padding portion based on a longest one of the time duration requirements received from the second communication devices.

The one or more integrated circuits are configured to determine the length of the padding portion such that a sum of (i) a time duration of a predefined interframe space between an end of the trigger frame and a beginning of the uplink transmission triggered by the trigger frame, (ii) a time duration of the padding portion and (iii) a time duration of one or more per-user information subfields in the trigger frame after a per-user information subfield corresponding to a second communication device having the longest one of the time duration requirements, and (iv) a frame check sequence (FCS) field in the trigger frame is equal to or greater than the longest one of the time duration requirements.

The one or more integrated circuits are configured to generate in the trigger frame to include an indication of a beginning of the padding portion in the trigger frame.

The trigger frame is a control frame of a trigger subtype, and wherein the one or more integrated circuits are configured to generate the trigger frame to include, in the trigger frame, an indication that the trigger frame is the control frame of the trigger subtype.

The one or more integrated circuits are configured to include the indication in an initial portion of a frame control field of the trigger frame such that the indication is entirely included in a first OFDM symbol that includes the initial portion of the trigger frame.

The one or more integrated circuits are configured to receive an uplink orthogonal frequency division multiple access (OFDMA) from the multiple second communication devices, wherein the OFDMA transmission includes the simultaneous uplink transmissions, triggered by the trigger frame, in respective frequency channels allocated to respective ones of the multiple second communication devices.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless communication network, the method comprising:
determining, at a first communication device, respective time duration requirements for preparing uplink transmissions by multiple second communication devices as part of an uplink multi-user (MU) transmission;
generating, at the first communication device, a physical layer (PHY) data unit that includes a trigger frame, wherein the trigger frame is for triggering simultaneous uplink transmissions by multiple second communication devices as part of the uplink MU transmission, wherein the trigger frame includes a trigger information portion, and wherein the PHY data unit is generated such that a duration between transmission of an end of the trigger information portion and transmission of an end of the PHY data unit is sufficient to satisfy the respective time duration requirements of the multiple second communication devices;

transmitting, with the first communication device, the PHY data unit; and receiving, at the first communication device, the simultaneous uplink transmissions, triggered by the trigger frame, from the multiple second communication devices.

2. The method of claim 1, wherein:

generating the PHY data unit includes generating the PHY data unit to include a padding portion that is to be transmitted after transmission of the trigger information portion; and the method further comprises determining a length of the padding portion based on the respective time duration requirements of the multiple second communication devices.

3. The method of claim 2, wherein generating the PHY data unit to include the padding portion includes generating the trigger frame to include the padding portion.

4. The method of claim 3, wherein generating the trigger frame includes generating the trigger frame to include:

an error detection information field; and the padding portion between the trigger information portion and the error detection information field.

5. The method of claim 2, wherein determining the length of the padding portion comprises:

determining the length of the padding portion such that a sum of (i) a time duration of a predefined interframe space between an end of the PHY data unit and a beginning of the uplink transmission triggered by the trigger frame and (ii) a time duration of the padding portion is equal to or greater than a longest one of the time duration requirements.

6. The method of claim 5, wherein the predetermined interframe space is a short interframe frame space (SIFS).

7. The method of claim 5, wherein:

the length of the padding portion is determined according to:

$$L_{PAD,MAC} = \left\lceil \frac{N_{DBPS} \cdot m_{PAD}}{8} \right\rceil$$

$L_{PAD,MAC}$ is the length of the padding portion in bytes;
$N_{DBPS}$ is a number of data bits per orthogonal frequency division multiplexing (OFDM) symbol defined by a communication protocol; and
$m_{PAD}$ is an integer determined based on a longest one of the time duration requirements.

8. The method of claim 7, wherein:

the communication protocol defines at least a first duration of OFDM symbols and a second duration of OFDM symbols;

the first duration of OFDM symbols is shorter than the second duration of OFDM symbols; and $N_{DBPS}$ is a number of data bits per OFDM symbol corresponding to the first duration of OFDM symbols.

9. The method of claim 1, wherein generating the PHY data unit includes:

generating, at the first communication device, the PHY data unit to include an aggregate media access control protocol data unit (A-MPDU) that includes i) the trigger frame, and ii) a plurality of media access control protocol data unit (MPDU) delimiter fields;

wherein the trigger frame is transmitted prior to one or more of the MPDU delimiter fields.

10. The method of claim 9, wherein:

the A-MPDU includes a plurality of media access control (MAC) data units;

the trigger frame is one of the MAC data units; and the trigger frame is transmitted prior to any other MAC data unit in the A-MPDU.

11. The method of claim 1, further comprising:

generating, at the first communication device, a media access control (MAC) header associated with the trigger frame, wherein the MAC header includes a frame control field, wherein the frame control field includes a type subfield set to indicate a control-type frame, and wherein the frame control field also includes a subtype subfield set to indicate a trigger-subtype frame.

12. An apparatus, comprising:

a wireless network interface device associated with a first communication device, wherein the wireless network interface device includes one or more integrated circuit (IC) devices configured to:

determine respective time duration requirements for preparing uplink transmissions by multiple second communication devices as part of an uplink multi-user (MU) transmission, generate a physical layer (PHY) data unit that includes a trigger frame, wherein the trigger frame is for triggering simultaneous uplink transmissions by the multiple second communication devices as part of the uplink MU transmission, wherein the trigger frame includes a trigger information portion, and wherein the PHY data unit is generated such that a duration between transmission of an end of the trigger information portion and transmission of an end of the PHY data unit is sufficient to satisfy the respective time duration requirements of the multiple second communication devices, transmit the PHY data unit, and receive the simultaneous uplink transmissions, triggered by the trigger frame, from the multiple second communication devices.

13. The apparatus of claim 12, wherein the one or more IC devices are configured to:

generate the PHY data unit to include a padding portion that is to be transmitted after transmission of the trigger information portion; and determine a length of the padding portion based on the respective time duration requirements of the multiple second communication devices.

14. The apparatus of claim 13, wherein the one or more IC devices are configured to generate the trigger frame to include the padding portion.

15. The apparatus of claim 14, wherein the one or more IC devices are configured to generate the trigger frame to include:

an error detection information field; and the padding portion between the trigger information portion and the error detection information field.

16. The apparatus of claim 13, wherein the one or more IC devices are configured to:

determine the length of the padding portion such that a sum of (i) a time duration of a predefined interframe space between an end of the PHY data unit and a beginning of the uplink transmission triggered by the trigger frame and (ii) a time duration of the padding portion is equal to or greater than a longest one of the time duration requirements.

17. The apparatus of claim 16, wherein the predetermined interframe space is a short interframe frame space (SIFS).

18. The apparatus of claim 16, wherein:
the length of the padding portion is determined according to:

$$L_{PAD,MAC} = \left\lceil \frac{N_{DBPS} \cdot m_{PAD}}{8} \right\rceil$$

$L_{PAD\ MAC}$ is the length of the padding portion in bytes;
$N_{DBPS}$ is a number of data bits per orthogonal frequency division multiplexing (OFDM) symbol defined by a communication protocol; and
$m_{PAD}$ is an integer determined based on a longest one of the time duration requirements.

19. The apparatus of claim 18, wherein:
the communication protocol defines at least a first duration of OFDM symbols and a second duration of OFDM symbols;
the first duration of OFDM symbols is shorter than the second duration of OFDM symbols; and
$N_{DBPS}$ is a number of data bits per OFDM symbol corresponding to the first duration of OFDM symbols.

20. The apparatus of claim 12, wherein the one or more IC devices are configured to:
generate the PHY data unit to include an aggregate media access control protocol data unit (A-MPDU) that includes i) the trigger frame, and ii) a plurality of media access control protocol data unit (MPDU) delimiter fields; and
transmit the trigger frame prior to one or more of the MPDU delimiter fields.

21. The apparatus of claim 20, wherein:
the A-MPDU includes a plurality of media access control (MAC) data units;
the trigger frame is one of the MAC data units; and
the one or more IC devices are configured to transmit the trigger frame prior to any other MAC data unit in the A-MPDU.

22. The apparatus of claim 12, wherein the one or more IC devices are configured to:
generate a media access control (MAC) header associated with the trigger frame, wherein the MAC header includes a frame control field, wherein the frame control field includes a type subfield set to indicate a control-type frame, and wherein the frame control field also includes a subtype subfield set to indicate a trigger-subtype frame.

* * * * *